US012095780B2

(12) United States Patent
Mandliwala et al.

(10) Patent No.: US 12,095,780 B2
(45) Date of Patent: Sep. 17, 2024

(54) METHOD AND SYSTEM FOR ENFORCING INTRUSION DETECTION SIGNATURES CURATED FOR WORKLOADS BASED ON CONTEXTUAL ATTRIBUTES IN AN SDDC

(71) Applicant: VMware LLC, Palo Alto, CA (US)

(72) Inventors: Nafisa Mandliwala, Sunnyvale, CA (US); Sirisha Myneni, Santa Clara, CA (US); Subrahmanyam Manuguri, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 580 days.

(21) Appl. No.: 17/374,633

(22) Filed: Jul. 13, 2021

(65) Prior Publication Data
US 2023/0014040 A1 Jan. 19, 2023

(51) Int. Cl.
H04L 9/40 (2022.01)
(52) U.S. Cl.
CPC ...... H04L 63/1416 (2013.01); H04L 63/1425 (2013.01); H04L 63/1466 (2013.01); H04L 63/20 (2013.01)

(58) Field of Classification Search
CPC ............. H04L 63/1416; H04L 63/1425; H04L 63/1466
See application file for complete search history.

(56) References Cited

U.S. PATENT DOCUMENTS

| 8,204,905 B2 | 6/2012 | Kuo et al. |
| 9,842,112 B1 | 12/2017 | Heer et al. |
| 10,148,694 B1 * | 12/2018 | Sarin ................... H04L 63/14 |
| 11,663,105 B2 | 5/2023 | Zhou et al. |
| 2004/0255162 A1 * | 12/2004 | Kim ................ H04L 63/1408 709/224 |
| 2015/0095359 A1 | 4/2015 | Duxbury |

(Continued)

FOREIGN PATENT DOCUMENTS

GB 2403625 A 1/2005

OTHER PUBLICATIONS

Anton et al., "A Question of Context: Enhancing Intrusion Detection by Providing Context Information", Retrieved From https://arxiv.org/pdf/1905.11735, Published May 28, 2019 (Year: 2019).*

(Continued)

Primary Examiner — Chau Le
(74) Attorney, Agent, or Firm — Quarles & Brady LLP

(57) ABSTRACT

Some embodiments of the invention provide a method of implementing an intent-based intrusion detection and prevention system in a datacenter, the datacenter including at least one host computer executing multiple machines. The method receives a filtered set of intrusion detection signatures to be enforced on the at least one host computer. The method uses a set of contextual attributes associated with a particular data message to generate an intrusion detection signature for the particular data message, the generated intrusion detection signature including a bit pattern, each bit associated with a contextual attribute in the set. The method compares the generated intrusion detection signature with the received set of intrusion detection signatures to identify a matching intrusion detection signature in the received filtered set.

10 Claims, 11 Drawing Sheets

(56) References Cited

U.S. PATENT DOCUMENTS

| | | |
|---|---|---|
| 2015/0310014 A1 | 10/2015 | Yishay |
| 2017/0329783 A1 | 11/2017 | Singh et al. |
| 2018/0181754 A1* | 6/2018 | Gunda ................ G06F 21/602 |
| 2018/0295036 A1 | 10/2018 | Krishnamurthy et al. |
| 2019/0238429 A1 | 8/2019 | Chanda et al. |
| 2021/0081461 A1 | 3/2021 | Zhou et al. |
| 2021/0152581 A1 | 5/2021 | Hen et al. |
| 2021/0192043 A1 | 6/2021 | Bhary et al. |
| 2021/0218758 A1* | 7/2021 | Jain ....................... G06F 9/545 |
| 2023/0013808 A1 | 1/2023 | Myneni et al. |
| 2023/0014706 A1 | 1/2023 | Myneni et al. |
| 2023/0015632 A1* | 1/2023 | Myneni ................... G06F 9/54 |
| 2023/0018434 A1 | 1/2023 | Mandliwala et al. |
| 2023/0021269 A1 | 1/2023 | Mandliwala et al. |
| 2023/0153270 A1* | 5/2023 | Gopalakrishnan ........................... G06F 9/45558 707/822 |

OTHER PUBLICATIONS

Non-Published Commonly Owned U.S. Appl. No. 17/374,608, filed Jul. 13, 2021, 54 pages, VMware, Inc.

Non-Published Commonly Owned U.S. Appl. No. 17/374,611, filed Jul. 13, 2021, 53 pages, VMware, Inc.

Non-Published Commonly Owned U.S. Appl. No. 17/374,617, filed Jul. 13, 2021, 54 pages, VMware, Inc.

Non-Published Commonly Owned Related U.S. Appl. No. 17/374,623 with similar specification, filed Jul. 13, 2021, 54 pages, VMware, Inc.

Non-Published Commonly Owned Related U.S. Appl. No. 17/374,630 with similar specification, filed Jul. 13, 2021, 54 pages, VMware, Inc.

Non-Published Commonly Owned U.S. Appl. No. 18/196,367, filed May 11, 2023, 36 pages, VMware, Inc.

* cited by examiner

```
@load base/protocols/ftp
@load base/frameworks/sumstats
@load base/utils/time module FTP;

export {
    redef enum Notice: :Type += {
                Bruteforcing
    };
    const bruteforce_threshold: doube = 20 &redef;
    const bruteforce_measurement_interval = 15mins &redef;
} event bro_init( )
    {
    local r1: SumStats: :Reducer = [$stream="ftp.failed_auth",
                            $apply=set(SumStats: :UNIQUE),
                            $unique_max=double_to_count(bruteforce_threshold+2}];
    SumStats: : create([$name="ftp-detect-bruteforcing",
                        $epoch=bruteforce_mearsurement_interval,
                        $reducers=set(r1),
                        $threshold_val(key: SumStats: :Key, result: SumStats: :Result) =
                            {
                            return result["ftp.failed_auth"]$num+0.0;
                            },
                        $threshold=bruteforce_threshold,
                        $threshold_crossed(key: SumStats: :Key, result: SumStats: :Result) =
                            {
                            local r = result["ftp.failed_auth"];
                            local dur = duration_to_mins_secs(r$end-r$begin);
                            local plural = r$unique>1 ? "s" : "";
                            local message = fmt("%s had %d failed logins on %d FTP server%s in %s",
                                    key$host, r$num, r$unique, plural, dur);
                            NOTICE([$note=FTP: :Bruteforcing,
                                    $src=key$host,
                                    $msg=message,
                                    $identifier=cat(key$host)]);
                            }]);
    } event ftp_reply(c: connection, code: count, msg: string, cont_resp: bool)
    {
    local cmd = c$ftp$cmdarg$cmd;
    if ( cmd == "USER" || cmd == "PASS" )
        {
        if ( FTP: :parse_ftp_reply_code(code)$x == 5 )
            SumStats: :observe("ftp.failed_auth", [$host=c$id$orig_h], [$str=cat(c$id$resp_h)]);
        }
    }
```

METHOD AND SYSTEM FOR ENFORCING INTRUSION DETECTION SIGNATURES CURATED FOR WORKLOADS BASED ON CONTEXTUAL ATTRIBUTES IN AN SDDC

BACKGROUND

Today, enterprises use a multitude of intrusion detection systems (IDSs) to protect themselves against attacks. These systems are of various kinds including signature-based, anomaly-based, etc. When an administrator uses a signature-based IDS, for example, they set basic rules that take into account the signatures the administrators are interested in for particular workloads. However, these IDSs are not intuitive and make it nearly impossible for administrators to define specific, fine-grained policies by sifting through thousands of signatures, thus failing to capture an administrator's intent (e.g., prevent all logins from a group after hours).

BRIEF SUMMARY

Some embodiments of the invention provide a method of implementing an intent-based intrusion detection and prevention system in a datacenter that includes at least one host computer executing multiple machines. The intrusion detection and prevention system is used to detect and prevent potential intrusion events using intrusion detection scripts, rules, and signatures. The method receives an intent-based API command that defines intent for a set of context-based intrusion detection rules to detect and prevent threats in the datacenter. The method uses multiple contextual attributes to convert the defined intent into a set of one or more intrusion detection scripts for enforcement on the at least one host computer in the datacenter. The method then provides the set of one or more intrusion detection scripts to an intrusion detection system operating on the host computer for enforcement.

In some embodiments, the method is performed by a set of servers, and the intent-based API command is received from a user through a user interface provided by the server set. The server set, in some embodiments, serves as network controllers and network managers for the datacenter. Prior to receiving the intent-based API command, the server set receives contextual attributes from host computers in the datacenter, and provides these contextual attributes through the user interface for viewing and for use in generating the intent-based API command (i.e., for use as criteria for intrusion detection).

The intent-based intrusion detection scripts in some embodiments are used to detect both anomalous (e.g., threatening) user behavior (e.g., >N number of failed login attempts by a single user), as well as anomalous data message traffic behavior (e.g., >N number of sources attempting to access a particular resource at the same time). In some embodiments, an intent-based intrusion detection script can be based on any of a number of attempts to access a particular resource, the type of resource at which the access attempts are aimed, the time of day of the access attempts, a user identifier or group identifier associated with a flow, etc.

In some embodiments, the contextual attributes include AppID (i.e., traffic type), process name, file hash, publisher information, installation path, user identity, source and destination addresses, etc., as well as endpoint and/or network attributes from sources external to the host computer. In some embodiments, the contextual attributes are both in generating intent-based intrusion detection scripts, as well as in resolving the intent-based intrusion detection scripts. The intrusion detection scripts, in some embodiments, specify for alerts to be sent to the server set when a potential intrusion is detected. Conjunctively, or alternatively, intrusion detection scripts can specify an action to be taken when such a potential intrusion is detected.

In addition to the intrusion detection scripts, some embodiments also provide a method for identifying intrusion detection signatures applicable to workloads performed by machines executing on host computers in the datacenter. In some embodiments, the server set performs a filtering operation on multiple intrusion detection signatures using the collected contextual attributes to identify applicable signatures. Alternatively, or conjunctively, some embodiments allow users to select (i.e., through the user interface) sets of signatures to be applied to specific sets of workloads that are identified based on the contextual attributes.

The intrusion detection systems operating on host computers, in some embodiments, use collected contextual attributes to identify and resolve intrusion detection signatures on the data plane. In some embodiments, the intrusion detection systems identify and resolve signatures by determining that a specific type of application (e.g., specific type of medical application or financial application) is executing on a particular VM and is sending out a particular type of data at a particular rate and volume based on the contextual attributes, each data being one or more bits in a bit pattern (i.e., a generated signature), and mapping this bit pattern/generated signature to a stored signature (i.e., a signature received from the network managers).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 3 illustrates a script generated according to an intent-based API command that includes a request specifying intent for intrusion detection signatures, according to some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of implementing an intent-based intrusion detection and prevention system in a datacenter that includes at least one host computer executing multiple machines. The intrusion detection and prevention system is used to detect and prevent potential intrusion events using intrusion detection scripts, rules, and signatures. The method receives an intent-based API command that defines intent for a set of context-based intrusion detection rules to detect and prevent threats in the datacenter. The method uses multiple contextual attributes to convert the defined intent into a set of one or more intrusion detection scripts for enforcement on the at least one host computer in the datacenter. The method then provides the set of one or more intrusion detection scripts to an intrusion detection system operating on the host computer for enforcement.

In addition to the intrusion detection scripts, some embodiments also provide a method for identifying intrusion detection signatures applicable to workloads performed by machines executing on host computers in the datacenter. In some embodiments, the server set performs a filtering operation on multiple intrusion detection signatures using the collected contextual attributes to identify applicable signatures. Alternatively, or conjunctively, some embodiments allow users to select (i.e., through a user interface) sets of signatures to be applied to specific sets of workloads that are identified based on the contextual attributes.

Figure 1:
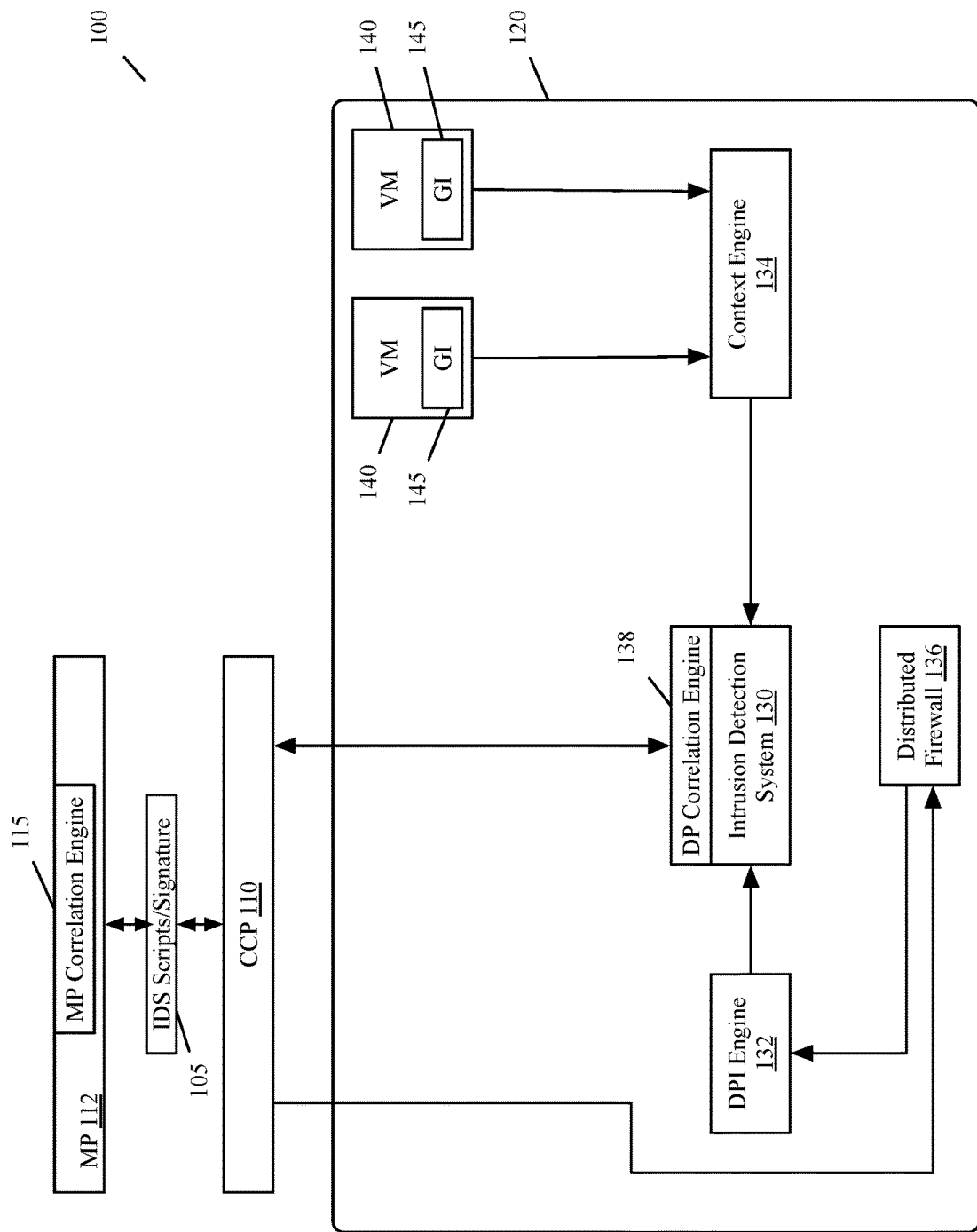
FIG. 1 illustrates a simplified example of a software-defined datacenter (SDDC) of some embodiments in which the intrusion detection and prevention system described herein is implemented.

FIG. 1 illustrates a simplified example of a software-defined datacenter (SDDC) 100 of some embodiments in which the intrusion detection and prevention system described herein is implemented. As shown, the datacenter 100 includes a management plane 112, a central control plane 110, and a host computer 120. The host computer 120 includes an intrusion detection system (IDS) 130, a DPI engine 132, a context engine 134, a distributed firewall 136, and a set of VMs 140.

The management plane 112 is implemented by one or more network managers that are responsible for receiving user-defined intent (i.e., through a user interface (UI) (not shown)) in the form of intent-based API commands, translating this intent into one or more context-based intrusion detection scripts (also referred to herein as intrusion detection rules), and providing these scripts to a set of network controllers that implement the central control plane 110 for distribution to SDDC resources (e.g., the intrusion detection system 130) for enforcement. In addition to the scripts, the network managers implementing the management plane 112 also provide filtered sets of intrusion detection signatures to the set of network controllers for distribution to the SDDC resources, according to some embodiments. In some embodiments, the filtered sets of intrusion detection signatures are sets of intrusion detection signatures selected by a user (i.e., through a UI) to be applied to specific sets of processes.

The central control plane 110 in some embodiments collects (i.e., receives) contextual attributes from the IDS 130 on the host computer 120, and provides the contextual attributes to the management plane 112. In some embodiments, the central control plane 110 collects attributes and information from other sources not on the host computer 120, such as intrusion detection signatures and/or detected threats from other host computers, compute context from one or more servers (e.g., cloud context from cloud vendors, or compute virtualization context by datacenter virtualization software), identity context from directory service servers, mobility context from mobility management servers, endpoint context from DNS (domain name server) and application inventory servers, network context (e.g., virtual network context from network virtualization server), etc.

The collection of contextual information (e.g., information from the IDS, DPI module, and context engine and/or information from other context sources), in some embodiments, allows the management plane to provide a user interface (UI) to the network/compute administrators to visualize the compute and network resources in the datacenter, and to alert the network/compute administrators of any detected threats/intrusions. Moreover, the rich set of contextual attributes collected from a variety of sources allow the management plane to provide controls through this UI for these administrators to continue to define/declare intent for intrusion detection to be translated into intrusion detection signatures that can be enforced on the data plane, as well as to specify other context-based service rules and/or policies. These intrusion detection rules, intrusion detection signatures, and service rules/policies are then distributed to resources in the datacenter so that service engines can perform context-based service operations and continue to provide information to the central control plane/management plane.

The intent-based API command in some embodiments is a simple declaratory statement of intent. For example, in some embodiments, the simple declaratory statement specifies to alert the management plane (i.e., via a set of network controllers or network managers) when certain conditions are detected. In some embodiments, for example, a host computer may detect an ongoing advanced persistent threat (APT), and specify intent to stop the detected APT and prevent additional APTs. The APT in some embodiments is detected based on a user attempting to use a hash-based login approach as opposed to a standard username/password approach, a user trying to connect on multiple hosts at the same time, a user requesting privilege escalation, a flow of data flowing through an inter-process communication (IPC) socket, or a significant amount of data being uploaded through IPC sockets. An example of a simple declaratory statement of intent to prevent such attacks, in some embodiments, may include "deny if user ANY AND has N number of failed logins AND tries to start process Y OR process Z".

In some embodiments, the intent-based API command is a hierarchical API command that includes two or more commands that define or modify the intent for (1) one or more application segments, and (2) one or more policies associated with the application segments. The different commands in the hierarchical API command can be nested under other commands, e.g., the definition of one group of applications can include the definition of specific machines (e.g., specific VMs) to implement specific applications in the group, according to some embodiments.

In some embodiments, hierarchical API commands are provided to administrators as predefined events and attributes that can be used by the administrators to create their "intent" for defining intrusion detection signatures. In some embodiments, as flows are processed, the management plane receives additional attributes from various sources in the SDDC, and provides these additional attributes for use by administrators to create additional rules and/or modify existing rules based on real-time (i.e., current) conditions. Additionally, some embodiments provide predefined templates that encapsulate well-known applications and their dependencies, as well as an ability to model the applications based on the administrator's requirements.

In some embodiments, the hierarchical API command is defined in a declarative language. In some embodiments, an intrusion detection system framework that is part of the management plane parses the hierarchical API command into several commands that (1) direct compute managers in the SDDC to deploy and configure the application segments of the multi-segment application defined in the hierarchical API command, and (2) direct the network managers in the SDDC to define and deploy intrusion detection and prevention rules for the application segments as specified by the user-defined intent. Also, in some embodiments, the management plane/central control plane further directs the network managers to define and deploy network forwarding and service rules for implementing communication profiles between the application segments as specified by the hierarchical API command (or other configuration data), and between application segments and other applications.

In some embodiments, the application segments are deployed as VMs or containers executing on host computers, and/or as standalone computers, in the SDDC. Similarly, network forwarding and service rules in some embodiments are processed by software forwarding elements (e.g., software switches and routers) and software middlebox service VMs (e.g., distributed firewalls, as well as other service containers and/or services modules executing on the host computers in the SDDC), while the intrusion detection scripts and intrusion detection signatures are processed by the IDS. The software forwarding and service rules are also configured in some embodiments on hardware forwarding elements (e.g., top-of-rack switches), standalone hardware or software gateways, and/or standalone middlebox appliances in the SDDC.

The intrusion detection scripts and intrusion detection signatures 105 in some embodiments are used to detect both anomalous user behavior (e.g., >N number of failed login attempts by a single user), as well as anomalous data message traffic behavior (e.g., >N number of sources attempting to access a particular resource at the same time). In some embodiments, a context-based intrusion detection script can be based on any of a number of attempts to access a particular resource, the type of resource at which the access attempts are aimed, the time of day of the access attempts, a user identifier or group identifier associated with a flow, etc.

The IDS 130 provides intrusion detection and prevention services based on the intrusion detection scripts and intrusion detection signatures 105 provided by the management plane 112 as well as contextual attributes received from the context engine 134 and the DPI engine 132. The IDS 130 includes a data plane (DP) correlation engine 138 for associating the contextual attributes received from the context engine 134 with the AppID, and any other attributes, received from the DPI engine 132, and providing these associated (i.e., correlated) attributes to the central control plane 110 for delivery to the management plane 112. In some embodiments, the IDS 130 provides the attributes periodically (e.g., after a certain number of data messages have been processed, every X amount of time, etc.), while in other embodiments, the IDS 130 provides this data on a per-flow basis.

In some embodiments, the management plane correlation engine 115 performs a filtering operation using the received associated attributes. The filtering operation, in some embodiments, includes matching the received associated attributes with attributes specified in intrusion detection signatures in order to identify intrusion detection signatures applicable to workloads performed by the VMs 140 executing on the host computer 120. Alternatively, or conjunctively, the management plane 112 receives selections of workloads and intrusion detection signatures to apply to these workloads from users though a UI (not shown).

In order to provide the contextual attributes to the IDS 130, the context engine 134 registers with the GI agents 145 executing on the VMs 140 as mentioned above to receive contextual attributes collected by the GI agents 145 during processes performed by the VMs 140 on data messages of various flows. While illustrated as VMs in the datacenter 100, the VMs 140 can be other types of machines in other embodiments, such as containers, while the GI agents 145 are modules executing within memory space of the containers. In still other embodiments, the machines are a mix of VMs and containers.

On each VM 140, a GI agent 145 executes in order to collect contextual attributes for the context engine 134. While shown as direct communications in this example, all of the communication between the context engine 134 and the GI agents 145 in some embodiments are relayed through a MUX (not shown). One example of such a MUX is the MUX that is used by the Endpoint Security (EPSec) platform of ESX hypervisors of VMware, Inc. In some embodiments, the GI agents 145 communicate with the MUX through a fast communication channel (such as the VMCI channel of ESX). In some embodiments, this communication channel is a shared memory channel.

In some embodiments, the context engine 134 collects contextual attributes from the GI agents 145 installed on VMs 140 on its host 120 through a variety of different ways. For instance, in some embodiments, the GI agent on a data compute node (DCN) registers hooks (e.g., callbacks) with one or more modules (e.g., kernel-space modules or user-space modules) in the VM's operating system (OS) for all new network connection events and all new process events.

Upon occurrence of a new network connection event, the GI agents 145 provide a network event identifier to the context engine 134, in some embodiments. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, the context engine 134 receives additional process parameters from the GI agents 145. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of receiving all of the processing parameters associated with a network event in one shot, the context engine 134 in other embodiments uses the process identifier to query the GI agents 145 for additional process parameters associated with a network event.

The OS of the VM 140 in some embodiments holds up a new network event (i.e., does not start sending data messages for the network event) until the GI agent 145 on that VM 140 directs it to proceed with processing the network event. In some of these embodiments, the GI agent 145 only allows the OS to proceed with processing the network event after the context engine 134 has collected all of the needed attributes for this event (e.g., after receiving a message from the context engine 134 that specifies that it has received all of the process or network attributes that it needs for the new network event).

In some embodiments, the context engine 134 uses the process hash that it receives from the GI agent 145 to identify the name and version of the application (i.e., the software product) to which the process belongs. To do this, the context engine 134 in some embodiments stores process hashes and associated application names/versions, compares the process hash that it receives from the GI agent 145 with the stored process hashes to identify a matching hash, and then uses the application name/version of the matching hash as the application name and version of the process associated with the event.

In some embodiments, the context engine 134 obtains the process hashes and application names/versions from one or more network or compute managers, which may operate on another device or computer. In other embodiments, the context engine 134 provides the hash associated with a process identifier to a network or compute manager, which then matches this hash to its process hash records and provides the application name/version of the associated process to the context engine. Once the context engine 134 obtains the application name/version associated with a network event, it can provide the name and version attributes to the attribute-based service engines, which can use this information (i.e., the application name and/or version) to identify the service rule to enforce.

Upon occurrence of a process event on a VM 140, the VM's GI agent 145 in some embodiments provides a process event identifier to the context engine 134. The process event identifier provides a set of attributes pertaining to the process event. This set of attributes includes the process identifier in some embodiments. In some embodiments, this set also includes a user identifier and/or a group identifier (e.g., an activity directory (AD) identifier).

In some embodiments, the GI agent 145 provides all of the process parameters (e.g., process identifier, user ID, group ID, process name, process hash, loaded module identifiers, consumption parameters, etc.) associated with a process event to the context engine 134 when it reports the process event to the context engine 134. In other embodiments, the context engine 134 directs the GI agent 145 to collect from the OS modules additional process parameters that are associated with the process identifier that the context engine 134 received with the process event. These additional process parameters in some embodiments are the same (e.g., process name, process hash, loaded module identifiers, consumption parameters, etc.) as the process parameters mentioned above for reported network events.

The IDS 130 of some embodiments augments the contextual attributes that it receives from the context engine 134 with contextual attributes that it receives from other modules that execute on the host 120. The DPI engine 132 (also referred to as the deep packet inspector) is an example of such a module that provides contextual attributes to augment those that the context engine 134 collects from the GI agents 145, in some embodiments. The contextual attributes provided by the DPI engine 132, in some embodiments, include at least AppIDs (i.e., traffic types) associated with the data messages that the DPI engine 132 inspects. While not shown, some embodiments also include a packet mirror to generate copies of data messages to provide to the IDS 130 along with the contextual attributes from the DPI engine 132 and context engine 134.

In some embodiments, the IDS 130 is a host-based IDS that is installed in the host 120 and models normal behavior and builds statistical models around that normal behavior. Typical embodiments of host-based IDSs use system calls and anomalous program behavior to detect deviant behavior. In other embodiments, the IDS 130 is part of a network-based IDS that is installed at various points in the network and inspects traffic passing through these points. Network-based IDSs can be hardware-based or software-based and typically inspect large amounts of data, according to some embodiments.

In some embodiments, a DPI engine 132 is directed by a distributed firewall 136 or another module (e.g., the context engine 134) to examine data messages of a data message flow associated with a process ID to identify the type of traffic being sent in these data messages by the application associated with the process ID. In some embodiments, the distributed firewall 136 directs the DPI engine 132 to examine the data messages based on configuration data provided by network controllers of the central control plane 110. The DPI engine 132, in some embodiments, provides the traffic type (i.e., AppID) and any other data learned from inspecting the data message to the IDS 130 along with a copy of the data message. In some embodiments, the DPI engine 132 copies the data messages it inspects by providing the data messages to a packet mirror (not shown) that copies data messages and provides the copied data messages to the IDS 130, as mentioned above.

The IDS in some embodiments detects intrusions by utilizing a combination of a signature-based system that matches data messages with known malicious patterns (i.e., intrusion detection signatures) and an anomaly-based system (e.g., Zeek) that detects behavior that deviates from normal traffic or user behavior. By utilizing a combination of signature-based and anomaly-based systems, the embodiments described herein allow users to implement intrusion detection signatures generated based on user-defined intent, as will be described further below.

The identified traffic type is today commonly referred to as the AppID. Also, currently there are a number of DPI engines that analyze messages of a data message flow to generate the AppID for the data message flow. In some embodiments, the context engine combines the AppID that it obtains for a network event with other context attributes that it identifies for this event, in order to produce a very rich set of attributes that the service engines can then use to perform their services. The DP correlation engine 138 of the IDS 130, in some embodiments performs this correlation operation, and, in addition to providing the correlated attributes to the central control plane 110, stores the correlated attributes in an attributes storage (not shown) from which they can be accessed by the context engine 134 for use by the service engines.

This rich set of attributes provides true application identity (i.e., the application name, application version, application traffic type, etc.), based on which the service engines can perform their services. In some embodiments, the IDS 130 uses a network event's five-tuple identifier to associate the AppID for this event's data message flow with the contextual attributes that the context engine 134 collects from the GI agent 145 of the VM 140 associated with the data message flow, from which the data message flow emanates).

The IDS 130 in some embodiments also includes a threat detection module (not shown) that provides a threat level indicator that specifies the threat level associated with a particular application that is executing on a VM 140. Once the context engine 134 obtains a set of process parameters that specify that a process has started on a machine (e.g., VMs 140) or is sending data messages on the machine, the context engine 134 provides these process parameters (e.g., process hash, application name, application version, AppID, other process parameters, etc.) to the threat detection module of the IDS 130.

This threat detection module then generates a threat level indicator (e.g., low, medium, high, etc.) for the identified process and provides this threat level indicator to the context engine 134. In some embodiments, the threat detection module assigns a threat score to an application running on a VM 140 based on various application behavioral factors, such as (1) whether it does poor input validation, (2) whether it passes authentication credentials over unencrypted network links, (3) whether it uses weak password and account policies, (4) whether it stores configuration secrets in clear text, (5) whether it can transfer files, (6) whether the application is known to propagate malware, (7) whether the application is purposely evasive, (8) whether the application has known vulnerabilities, etc.

The context engine 134 in some embodiments provides the threat level indicator produced by the threat detection module of the IDS 130 to one or more service engines as another contextual attribute for performing services on a new process event or the data messages of a new network event. The one or more service engines can use the threat level indicator, in some embodiments, as another attribute to identify service rules to enforce.

In some embodiments, the context engine 134 stores the contextual attributes that it collects for network events and process events in an attribute storage (not shown). This attribute storage, in some embodiments, is also accessible to the IDS 130, as mentioned above, as well as the DPI engine 132. In some embodiments, the context engine 134 stores each set of contextual attributes with one or more network event identifiers and/or process identifiers. For example, in some embodiments, the context engine 134 stores the collected contextual attributes for a new process event with the process identifier, or with a reference to this identifier. The context engine 134 then uses the process identifier to provide the collected context attributes to a service engine (e.g., the distributed firewall 136) that performs a service for the process event.

The context engine 134 in some embodiments stores the collected context attributes for a new network connection event with the five-tuple identifier of the network connection event, or with a reference to this five-tuple identifier. In some of these embodiments, the context engine 134 provides to a service engine the context attributes for a network event along with this event's five-tuple identifier. The data messages for this network event will use this five-tuple identifier, and hence the service engine can use the supplied five-tuple identifier to identify the context attributes associated with a data message flow.

The context engine 134 employs a push model in some embodiments to distribute the collected contextual attributes to services engines on the host computer 120, while in other embodiments this engine 134 employs a pull model to distribute these attributes to the service engines. In still other embodiments, the context engine 134 employs a push model for some service engines and a pull model for other service engines. In the push model, the context engine 134 in some embodiments distributes to a service engine the contextual attributes that it collects for a process event or a network event with the process's identifier and/or the network event's flow identifier (e.g., the flow's five-tuple identifier).

In some embodiments, the context engine 134 distributes to the service engine only the contextual attributes that are relevant for that service engine's service rules. In other words, in these embodiments, the context engine 134 compares each collected attribute in a set of collected attributes (e.g., for a network event or a process event) with a list of attributes used by a service engine's service rules, and discards each collected attribute that is not used by the service rules. The context engine 134 then provides to the service engine only the subset of collected attributes (in the set of collected attributes) that is being used by the service engine's service rules. In other embodiments, the service engines perform this filtering operation to discard the contextual attributes that are not needed.

In the pull model, the context engine 134 receives queries from a service engine for the contextual attributes that the context engine 134 has collected for a particular process or network connection. In some embodiments, the context engine 134 receives a process ID or a flow identifier (e.g., five-tuple identifier) with a query from the service engine, and uses the received identifier to identify the attribute set that it has to provide to the service engine.

In some embodiments, the context engine 134 generates a service token (also called a service tag) for the collection of attributes that are relevant for the service engine and provides this service token to another module (e.g., the GI agent or another module on the host) to pass along to the service engine (e.g., pass along in a data message's encapsulating header). The service engine then extracts the service token and provides this service token to the context engine 134 in order to identify the contextual attributes that the context engine 134 has to provide to the service engine.

When it receives and correlates contextual attributes, in some embodiments, the IDS 130 performs a matching operation to detect threats based on the correlated contextual attributes. For example, based on the correlated contextual attributes, the IDS 130 can determine that a specific type of application (e.g., specific type of medical application or financial application) executes on a particular VM and is sending out a particular type of data at a particular rate and volume, each data being one or more bits in a bit pattern (i.e., a generated signature) that gets mapped to a stored signature (i.e., a signature received from the central control plane in a set of signatures filtered for the workloads performed in VMs on the host computer).

In some embodiments, the IDS 130 retrieves the contextual attributes from the context engine 134 and DPI engine 132 on a per-data message basis (i.e., for every data message processed by elements on the host computer), or on a per-flow basis (i.e., for every N data message in a data message flow). In other embodiments, the context engine 134 and DPI engine 132 are configured to automatically provide contextual attributes to the IDS 130 on a per-data message basis, or on a per-flow basis. As mentioned above, the generated signature, in some embodiments, is a generated pattern of bits. For instance, the IDS 130 may request context from the DPI engine 132 and the context engine 134, receive 300 contextual attributes in response, and generate a bit pattern corresponding to the 300 contextual attributes. The IDS 130 then compares the bit pattern with other bit patterns (i.e., signatures) received from the central control plane 110 to determine whether there are any matches.

When a generated signature matches a stored signature, in some embodiments, the IDS 130 sends an alert through the central control plane 110 to the management plane 112. In some embodiments, the management plane 110 performs a specific action based on the alert, such as providing the alert in a report through a UI (not shown) for review by an administrator. In addition to matching a signature, the contextual attributes in some embodiments may also match an intrusion detection script. For example, the matching signature may indicate a particular unauthorized user has attempted to access a particular server, while the matching script may indicate that the particular unauthorized user has attempted to access the particular server a threshold number of times, and any additional data messages from the particular unauthorized user should be dropped.

Figure 2:
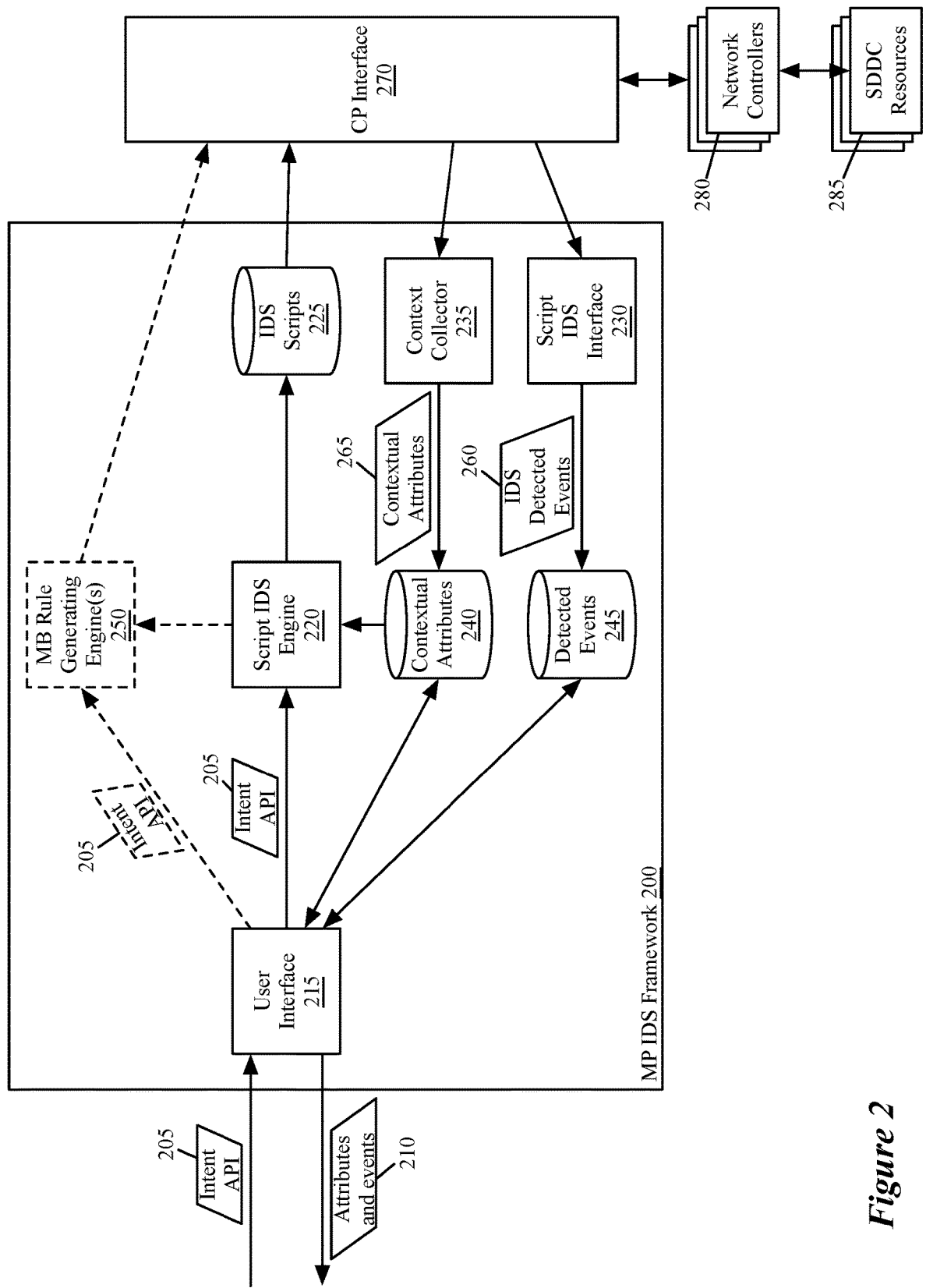
FIG. 2 illustrates a first portion of a management plane intrusion detection system framework that processes intent-based API commands received from tenant administrators in an SDDC, in some embodiments.

As described above, the management plane 110, in some embodiments, includes an IDS framework for processing contextual attributes and other data received from resources in the data plane, as well as for processing intent-based API commands from users. FIG. 2 illustrates a first portion of a management plane IDS framework 200 that processes intent-based API commands received from tenant administrators in an SDDC in order to implement intrusion detection rules and signatures in the SDDC, as well as to deploy multi-segmented applications and/or other resources in the SDDC. The intent-based API commands in some embodiments can also include requests for modifying existing intrusion detection rules (i.e., scripts) and previously deployed multi-segmented applications and resources.

As shown, the management plane IDS framework 200 includes a user interface 215, a script IDS engine 220, an IDS scripts storage 225, a script IDS interface 230, a detected events storage 245, a context collector 235, a contextual attribute storage 240, and a middlebox rule generating engine 250. The elements of the management plane IDS framework 200 communicate with a set of network controllers 280 through a control plane interface 270. The set of network controllers 280 communicate with SDDC resources 285 to receive attributes and other information used by the elements of the framework 200 and to implement intrusion detection policies and signatures in the SDDC, and deploy multi-segmented applications and/or other resources in the SDDC. It should be noted that while illustrated as separate elements in the framework 200, the middlebox rule generating engine(s) 250 in some embodiments includes the script IDS engine 220. Also, in some embodiments, the middlebox rule generating engine(s) 250 may be part of a different framework separate from the management plane IDS framework 200.

As shown, the user interface 215 of the framework 200 allows the framework 200 to provide contextual attributes 210 for viewing by users, and to receive intent-based API commands like the intent API 205. The intent-based API commands in some embodiments are received from an administrator's machine (e.g., from a VM, container, or standalone computer used by the administrator to specify intent in the intent-based API command). In some embodiments, as mentioned above and further described below, the administrator can use a template provided by the framework to generate an intent-based API command 205 and specify the intent.

In some embodiments, the intent-based API command 205 includes a syntactical representation of a multi-segmented application. The intent-based API command 205 in some embodiments is a hierarchical API command that includes two or more commands that define or modify (1) one or more application segments, and (2) one or more intrusion detection scripts for the one or more application segments. The hierarchical API command is hierarchical, as different commands can be nested under other commands, e.g., a domain definition can include an application-segment group definition which in turn can include one or more definitions of one or more machines (e.g., specific VMs or containers) to implement an application segment. In some embodiments, the hierarchical API command is defined in a declarative language. For instance, the command is written in a Javascript Object notation (JSON) format in some embodiments, but in other embodiments it can be expressed in other hierarchical formats such as the XML (Extensible Markup Language) format.

When an intent-based API command 205 is received by the framework 200 through the UI 215, the API 205 is provided to the script IDS engine 220 and/or one of the middlebox rule generating engines 250. In some embodiments, when the intent-based API command 205 is a hierarchical API command, the hierarchical API is parsed to identify several different requests (commands) contained within it. For instance, for a typical three-tier application, the hierarchical API command can specify the deployment of a webserver, an application server, and a database server. In such a situation, the script IDS engine 220 would parse the command 205 into three sets of one or more commands, with each set associated with the deployment of one of the tiers (e.g., the deployment of the webserver, appserver, or database server). In some embodiments, the script IDS engine 220 generates an input API tree from the command 205 that represents the parent-child relationship between the different portions of the command 205.

In some embodiments, after the script IDS engine 220 and/or one of the middlebox rule generating engines 250 breaks the hierarchical API command 205 into several individual requests, it validates each individual request and specifies whether each request satisfies all of the constraints in all of the policies that are applicable to the applications and/or resources referred to in the API. Alternatively, some embodiments include a parser that breaks the hierarchical API command 205 into individual requests, and distributes the requests to the appropriate engines (e.g., the script IDS engine 220 or middlebox rules generating engine(s) 250) for processing. Each request is associated with an application or other resource in the SDDC, in some embodiments. The script IDS engine 220 in some embodiments compares a set of attributes of the selected request's resource with a policy's target to determine whether the policy is applicable to the resource, and, after identifying at least one applicable policy, determines whether the identified policy's expression specifies a constraint that requires the selected request to be rejected.

When the script IDS engine 220 determines that a request should be rejected, a notification is sent through the UI 215 to an administrator's machine (not shown) indicating that the request is rejected, according to some embodiments. Alternatively, some embodiments first determine whether each of the requests included in the hierarchical API command 205 should be allowed or rejected, and sends a notification to the administrator's machine that specifies each rejected request. When the script IDS engine 2020 determines that the request should be allowed, and all requests have been checked, it then translates any intent specified in the requests and defined for intrusion detection purposes into one or more intrusion detection scripts that can be enforced in the SDDC.

For instance, FIG. 3 illustrates a script 300 generated according to an intent-based API command that includes a request specifying intent for intrusion detection as "deny if user ANY AND logs in via FTP AND denied 20 times". Based on the script 300, an alert would be sent to the management plane/central control plane (e.g., management plane 112/central control plane 110) any time a user reaches 20 failed attempts to log in via FTP (file transfer protocol). In some embodiments, the script also includes an action to be performed, such as blocking the user from making any additional login attempts.

As the script IDS engine 220 translates the received intent definitions into enforceable intrusion detection scripts, it stores these scripts in the IDS scripts storage 225. In some embodiments, the script IDS engine 220 uses contextual attributes from the contextual attribute storage 240 to translate the intent into intrusion detection scripts. For instance, a user may define intent that specifies to deny all non-e staff (i.e., non-executive staff) access to a server X. The script IDS engine 220, in some embodiments, uses the contextual attribute storage 240 to identify a context value associated with "non-e staff" (e.g., a group identifier or AD identifier associated with the group "non-e staff"), and uses the identified context value to generate the intrusion detection script. In other words, the type of contextual attributes specified in the received intent, in some embodiments, may differ from the type of contextual attributes specified in the intrusion detection script translated form the intent.

In some embodiments, when the framework 200 receives an intent-based API command 205 that includes intent for modifying an existing intrusion detection script, the script IDS engine 220 removes the existing script from the IDS scripts storage 225 and replaces it with the modified script. As the script IDS engine 220 stores the translated scripts in the IDS scripts storage 225, the control plane interface 270 in some embodiments retrieves the scripts from the IDS scripts storage 225 and interacts with one or more network controllers 280 to provide the intrusion detection scripts to the SDDC resources 285, such as the intrusion detection system 130 in the datacenter 100.

Additional examples of SDDC resources include host computers, VMs, containers, software and hardware forwarding elements, software and hardware middlebox service elements, etc. The network controllers 280, in some embodiments, include (1) compute managers and controllers that deploy and configure the application segments of the multi-segment application defined in hierarchical API commands, and (2) network managers and controllers that define and deploy the intrusion detection scripts and signatures, as well as any network forwarding and service rules for implementing the communication profiles for the application segments as specified by the hierarchical API commands.

In some embodiments, the application segments are deployed as VMs or containers executing on host computers, and/or as standalone computers, in the SDDC. Similarly, the intrusion detection scripts, intrusion detection signatures, and other network forwarding and service rules in some embodiments are processed by software forwarding elements (e.g., software switches and routers), software middlebox service VMs, service containers, and/or services modules executing on the host computers in the SDDC. These rules are also configured in some embodiments on hardware forwarding elements (e.g., top-of-rack switches), standalone hardware or software gateways, and/or standalone middlebox appliances in the SDDC.

The script IDS interface 230, in some embodiments, receives event information through the control plane interface 270 and records the received event information in the detected events storage 245 as illustrated by the IDS detected events 260. In some embodiments, the script IDS interface 230 generates custom scripts based on the received event information 260 and stores these custom scripts in the detected events storage 245. The event information 260, in some embodiments, can include alerts or detected intrusions, as well as any other network event a user may be interested in (e.g., FTP logins, file transfers, etc.).

The context collector 235 receives contextual attributes through the control plane interface 270 and stores these attributes in the contextual attributes storage 240 as illustrated by the contextual attributes 265. The contextual attributes include correlated sets of attributes provided by data plane correlation engines of intrusion detection systems that are implemented on host computers in the SDDC, in some embodiments. In some embodiments, the context collector 235 generates reports identifying the correlated sets of contextual attributes and stores the reports in the contextual attribute storage 240. As described above, the correlated sets of contextual attributes of some embodiments include attributes such as process names, file hashes, publisher information, installation paths, user identities, source and destination addresses, AppID (i.e., traffic type), etc., as well as endpoint and/or network attributes from sources external to the host computer.

In some embodiments, the contextual attributes stored in the contextual attribute storage 240, and the event information stored in the detected events storage 245, are provided through the UI 215 for viewing by users (e.g., administrators), as illustrated by the attributes and events 210. By providing such a rich and wide-ranging set of contextual attributes, users are able to better understand the network, fine-tune intrusion detection systems, and define very precise, customized, and context-rich policies. For example, a network administrator at a bank can define intent for a banking system that specifies to deny access to a particular server for all users except administrators. In some embodiments, users can define intent that covers intrusion detection and anti-malware. As described above, when a user defines intent for intrusion detection and/or other service or forwarding rules, the intent is provided in an intent-based API command 205 through the UI 215 and processed and translated by the script IDS engine 220.

Figure 4:
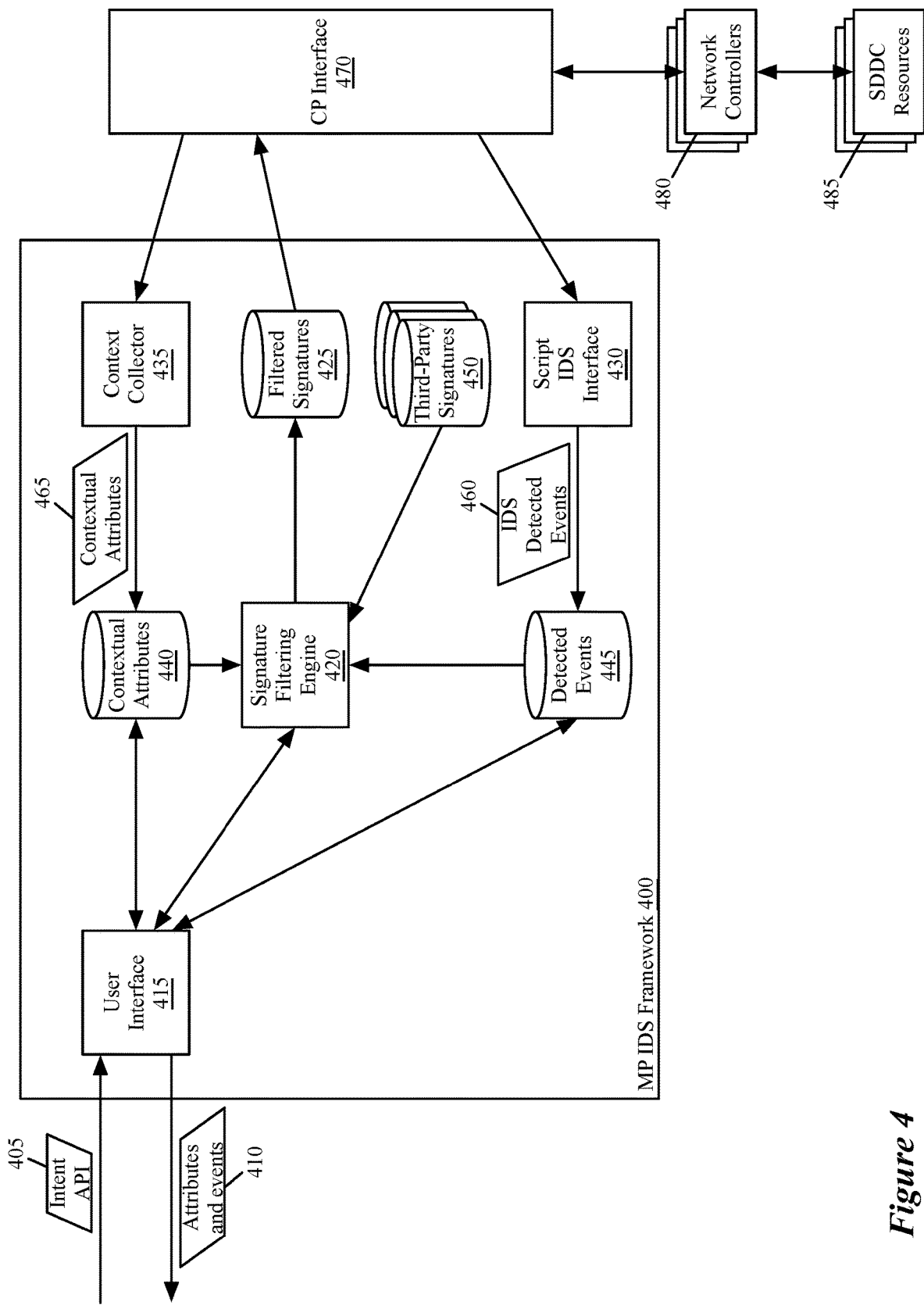
FIG. 4 illustrates a second portion of a management plane IDS framework that processes intent-based API commands received from tenant administrators in an SDDC.

FIG. 4 illustrates a second portion of a management plane IDS framework 400 that processes intent-based API commands 405 received from tenant administrators in an SDDC in order to implement intrusion detection policies and signatures in the SDDC, as well as to deploy multi-segmented applications and/or other resources in the SDDC. As described above, the intent-based API commands 405 in some embodiments can also include requests for modifying existing intrusion detection policies (i.e., scripts) and previously deployed multi-segmented applications and resources. Also, in some embodiments, the intent-based API commands 405 can specify different sets of intrusion detection signatures for different sets of workloads, as will be further described below.

Like the first portion of the management plane IDS framework 200, the second portion of the management plane IDS framework 400 includes a user interface 415, contextual attributes storage 440, a context collector 435, detected events storage 445, and a script IDS interface 430. Additionally, the second portion of the management plane IDS framework 400 includes a signature filtering engine 420, a filtered signatures storage 425, and third-party signatures storages 450. The elements of the management plane IDS framework 400 communicate with a set of network controllers 480 through a control plane interface 470. The set of network controllers 480 communicate with SDDC resources 485 to receive attributes and other information used by the elements of the framework 400, implement intrusion detection policies and signatures in the SDDC, and deploy multi-segmented applications and/or other resources in the SDDC.

As described above, the script IDS interface 430, in some embodiments, receives event information through the control plane interface 470, and records the received event information in the detected events storage 445, as illustrated by the IDS detected events 460. In some embodiments, the script IDS interface 430 generates custom scripts based on the received event information, and stores the custom scripts in the detected events storage 445. The event information, in some embodiments, can include alerts or detected intrusions, as well as any other network event a user may be interested in (e.g., FTP logins, file transfers, etc.).

The context collector 435, as described above, receives contextual attributes through the control plane interface 470, and stores the received contextual attributes in the contextual attribute storage 440, as illustrated by the contextual attributes 465. The contextual attributes, in some embodiments, include correlated sets of attributes correlated and provided by data plane correlation engines of intrusion detection systems implemented on host computers in the SDDC. In some embodiments, these correlated sets of contextual attributes include attributes such as process names, file hashes, publisher information, installation paths, user identities, source and destination addresses, AppID (i.e., traffic type), etc., as well as endpoint and/or network attributes from sources external to the host computer.

The signature filtering engine 420 performs a filtering operation to identify intrusion detection signatures to provide to different host computers based on contextual attributes from the contextual attributes storage 440 that are associated with workloads and processes performed by machines executing on the different host computers. In some embodiments, the signature filtering engine 420 evaluates signatures from multiple sources during the filtering operation, including third-party signatures stored in the third-party signatures storage 450.

In some embodiments, the signature filtering engine 420 performs an initial phase of the filtering operation to curate intrusion detection signatures based on known information about the workloads managed by network managers that implement the management plane before any contextual attributes associated with the workloads have been collected and received. For example, the signature filtering engine 420 would use known information about database servers, application servers, and web servers to identify different sets of intrusion detection signatures applicable to each of the different servers. The signature filtering engine 420 then stores the different sets of curated intrusion detection signatures in the filtered signatures storage 425 so that the signatures can be distributed to the host computers on which machines performing the workloads execute. In some embodiments, performing the filtering operation significantly reduces the number of signatures provided to each host computer (e.g., from tens of thousands of signatures down to hundreds of signatures), thereby improving the efficacy of signature matching on the data plane, increasing throughput, and reducing false positives.

As machines on host computers process data message flows, GI agents on the machines and DPI engines on the host computers collect contextual attributes and flow attributes associated with the data message flows and the processes performed on them, and the intrusion detection systems on the host computers (i.e., the data plane correlation engines of the intrusion detection systems) correlate the contextual and flow attributes. The correlated attributes are then provided by the intrusion detection systems (e.g., SDDC resources 485) to the network controllers 480, which then provide these attributes to the context collector 435 via the control plane interface 470.

As the context collector 435 receives correlated sets of attributes and records the attributes to the contextual attribute storage 440, the signature filtering engine 420 can retrieve the attributes for use in subsequent filtering operations. In some embodiments, the signature filtering engine 420 identifies additional intrusion detection signatures to be pushed to host computers based on the contextual attributes during the subsequent filtering operations. The received correlated sets of attributes, in some embodiments, include attributes associated with current and active data message flows. In some such embodiments, the identified additional intrusion detection signatures can include signatures that will be enforced on these current and active data message flows. That is, the management plane IDS framework, in some embodiments, curates intrusion detection signatures to be enforced on current data message flows (i.e., in real-time or near real-time) based on contextual attributes associated with the current flows.

The signature filtering engine 420, in some embodiments, also provides intrusion detection signatures associated with host computers in the datacenters and intrusion detection signatures from the third-party signatures storages 450, for viewing through the UI 415. In some embodiments, users (e.g., network administrators) can select a specific set of workloads for applying a set of intrusion detection signatures. In some embodiments, users select specific workloads based on the contextual attributes and event information 410 that is also provided through the UI 415. In response to such a selection, the signature filtering engine 420, in some embodiments, maps the specific operating systems and processes selected by the user with the signature set and generates a profile identifying the signature set and applicable host computer on which machines that run the specific processes execute. The signature filtering engine 420, in some embodiments, stores these mappings in the filtered signatures storage 425, while in other embodiments, the signature filtering engine 420 stores the mappings in a different storage (not shown).

Figure 5:
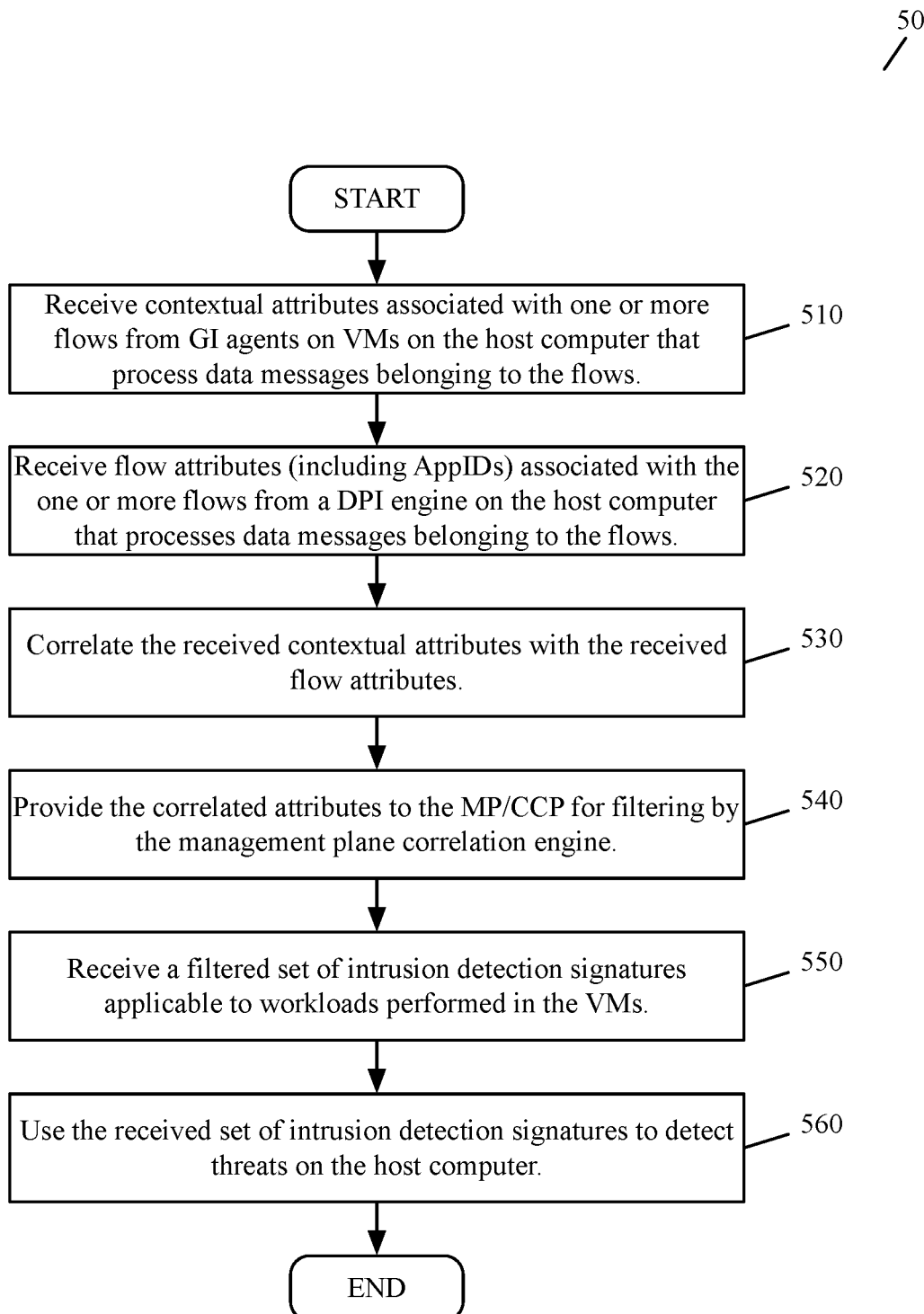
FIG. 5 conceptually illustrates a process for enforcing intrusion detection signatures on the data plane, in some embodiments.

FIG. 5 conceptually illustrates a process 500 for enforcing intrusion detection signatures on the data plane, in some embodiments. The process 500, in some embodiments, is performed by an intrusion detection system operating on a host computer. The process 500 starts by receiving (at 510) contextual attributes associated with one or more data message flows from GI agents on VMs that execute on the host computer and process data messages belonging to the flows. For instance, the intrusion detection system 130 in the datacenter 100 of FIG. 1 can receive contextual attributes from the GI agents 145 on the VMs 140 that execute on the host computer 120 (i.e., receives via the context engine 134).

The process receives (at 520) flow attributes, including AppIDs (i.e., traffic types), from a DPI engine that executes on the host computer and also processes data messages belonging to the flows. While described as two separate steps, the intrusion detection system of some embodiments receives the contextual attributes and the flow attributes simultaneously. In the example datacenter 100, the intrusion detection system 130 can receive flow attributes from the DPI engine 132 before, after, or at the same time as it is receiving contextual attributes through the context engine 134, according to some embodiments.

The process correlates (at 530) the received contextual attributes with the received flow attributes. This correlation, in some embodiments, is performed by a data plane correlation engine that is part of the intrusion detection system, such as the DP correlation engine 138 of the IDS 130 of FIG. 1. While described as an operation of the context engine 134, the IDS 130 in some embodiments uses a network event's five-tuple identifier to associate the AppID for this event's data message flow with the contextual attributes received from the context engine 134, which collects the contextual attributes from the GI agent 145 of the VM 140 associated with the data message flow (e.g., of the VM, or other data computer node (DCN), from which the data message flow emanates).

The process then provides (at 540) the correlated attributes to the central control plane for use in a filtering operation performed by the management plane correlation engine. The DP correlation engine 138, for example, provides the correlated attributes to the management plane 112/central control plane 110 to allow the MP correlation engine 115 to perform the filtering operation, which in some embodiments includes identifying intrusion detection signatures applicable to workloads performed in the VMs 140 based on the correlated attributes.

The process receives (at 550) a filtered set of intrusion detection signatures that are applicable to workloads performed in the VMs. In some embodiments, the filtered set of intrusion detection signatures includes signatures selected by a user (e.g., network administrator) for the workloads performed in the VMs. The user makes this selection, in some embodiments, based on the contextual attributes and other data provided through a UI. For instance, in some embodiments, the user selects sets of signatures to be applied to specific workloads identified based on process identifiers provided with the contextual attributes.

In some embodiments, the user selects a set of signatures that were collected from one host computer executing a machine that runs a particular application, and selects to apply the set of signatures to another machine that executes on another host computer and also runs the particular application. For instance, a user may determine, based on the contextual attributes, that a machine on particular host computer runs a financial application. Based on this determination, the user may identify a set of signatures that were collected from another host computer executing another machine that also runs the financial application, and select this set of signatures to apply to the machine on the particular host computer.

The process then uses (at 560) the received intrusion detection signatures to detect threats on the host computer. For example, in some embodiments, an intrusion detection signature can be used to detect threats for specific types of application traffic. Also, in some embodiments, intrusion detection signatures may be used to stop (i.e., prevent) further forwarding of certain traffic (e.g., prevent all traffic to or from a particular application specified by a signature or rule). Following 560, the process 500 ends.

Figure 6:
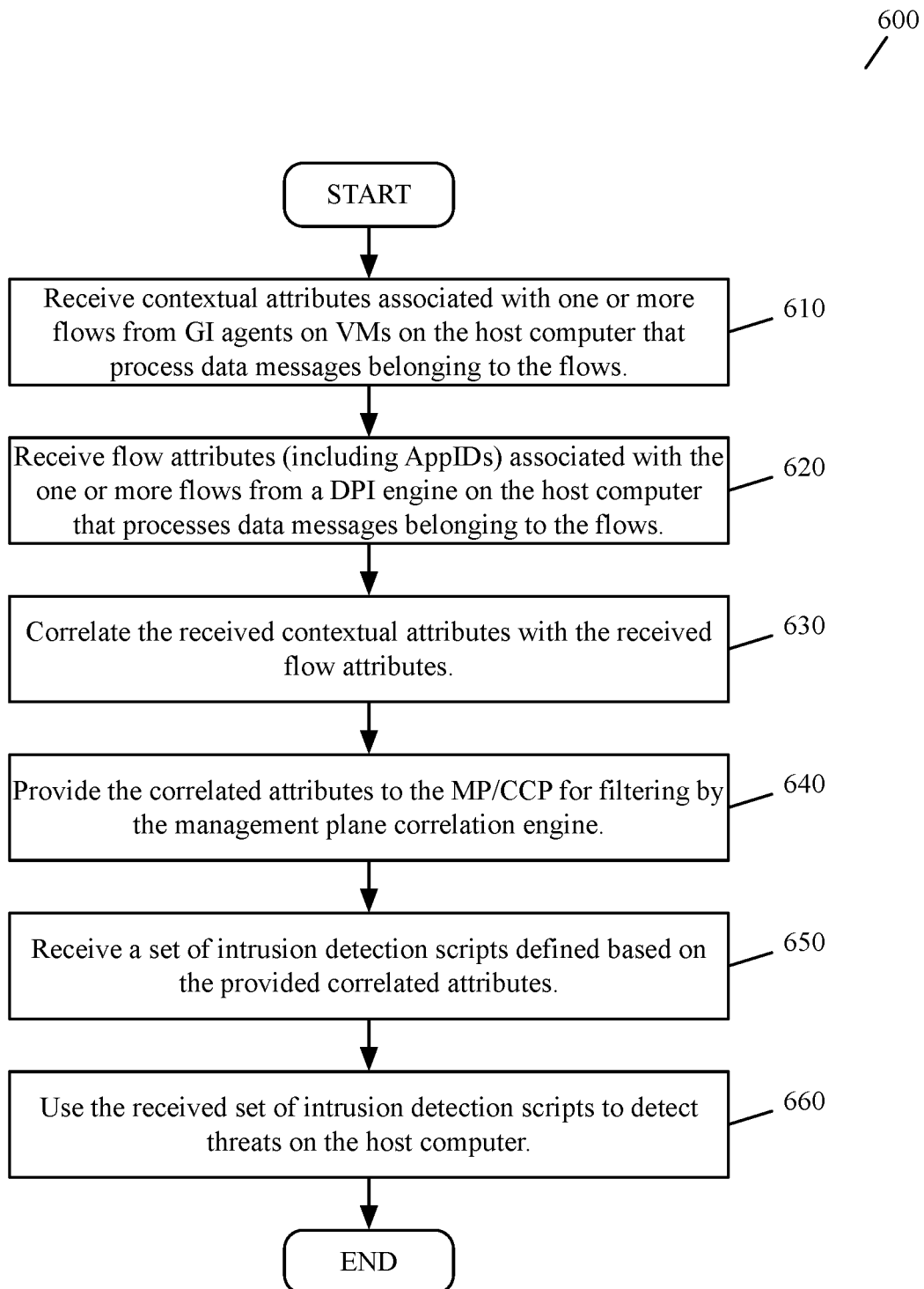
FIG. 6 conceptually illustrates a process for enforcing intrusion detection rules on the data plane, in some embodiments.

FIG. 6 conceptually illustrates a process 600 for enforcing intrusion detection rules on the data plane, in some embodiments. Similar to the process 500, the process 600 is performed, in some embodiments, by an intrusion detection system operating on a host computer. The process 600 starts by receiving (at 610) contextual attributes associated with one or more data message flows from GI agents on VMs that execute on the host computer and process data messages belonging to the flows. The intrusion detection system 130 in the datacenter 100 described above, for example, can receive contextual attributes from the GI agents 145 on the VMs 140 that execute on the host computer 120. In this example, the intrusion detection system 130 receives the attributes from the GI agents 145 through the context engine 134.

The process receives (at 620) flow attributes, including AppIDs (i.e., traffic types), from a DPI engine that executes on the host computer and also processes data messages belonging to the flows. In the example datacenter 100, the intrusion detection system 130 can receive flow attributes from the DPI engine 132 before, after, or at the same time as it is receiving contextual attributes through the context engine 134, according to some embodiments. While described as two separate steps, the intrusion detection system of some embodiments receives the contextual attributes and the flow attributes simultaneously.

The process correlates (at 630) the received contextual attributes with the received flow attributes. As described above, in some embodiments, this correlation operation is performed by a data plane correlation engine that is part of the intrusion detection system, such as the DP correlation engine 138 of the IDS 130. The IDS 130 in some embodiments uses a network event's five-tuple identifier to associate the AppID for this event's data message flow with the contextual attributes received from the context engine 134, which collects the contextual attributes from the GI agent 145 of the VM 140 (or other data message processing machine) associated with the data message flow (e.g., of the VM, or other data computer node (DCN), from which the data message flow emanates).

The process 600 then provides (at 640) the correlated attributes to the central control plane, which provides the attributes for viewing through a UI. For instance, in the management plane IDS framework 200, contextual attributes 265 from the contextual attributes storage 240 are provided for viewing (e.g., by administrators) through the UI 215. The contextual attributes 265, in some embodiments, include attributes associated with events detected by SDDC resources 285 from which the script IDS interface 230 generates custom scripts to store in the contextual attribute storage 240.

The process receives (at 650) a set of intrusion detection rules defined based on the provided correlated attributes. The set of intrusion detection rules, in some embodiments, are intrusion detection rules that have been translated from intent defined in intent-based API commands. For instance, in the management plane IDS framework 200, the script IDS engine 220 receives an intent-based API command 205 defining intent for such rules, and translates the intent into intrusion detection rules that can be enforced on the data plane.

The process then uses (at 660) the received set of intrusion detection rules to detect threats on the host computer. For instance, in some embodiments, an intrusion detection rule can specify to send alerts to the network controllers/network managers when certain conditions are detected. The script 300 illustrated in FIG. 3, for example, is translated from user-defined intent that specifies "deny if user ANY AND logs in via FTP AND denied 20 times". Thus, if any user were to attempt to log in via FTP 20 times and be denied each of those 20 times, an alert would be sent to the network controllers/network managers identifying the detected event. Following 660, the process 600 ends.

Figure 7:
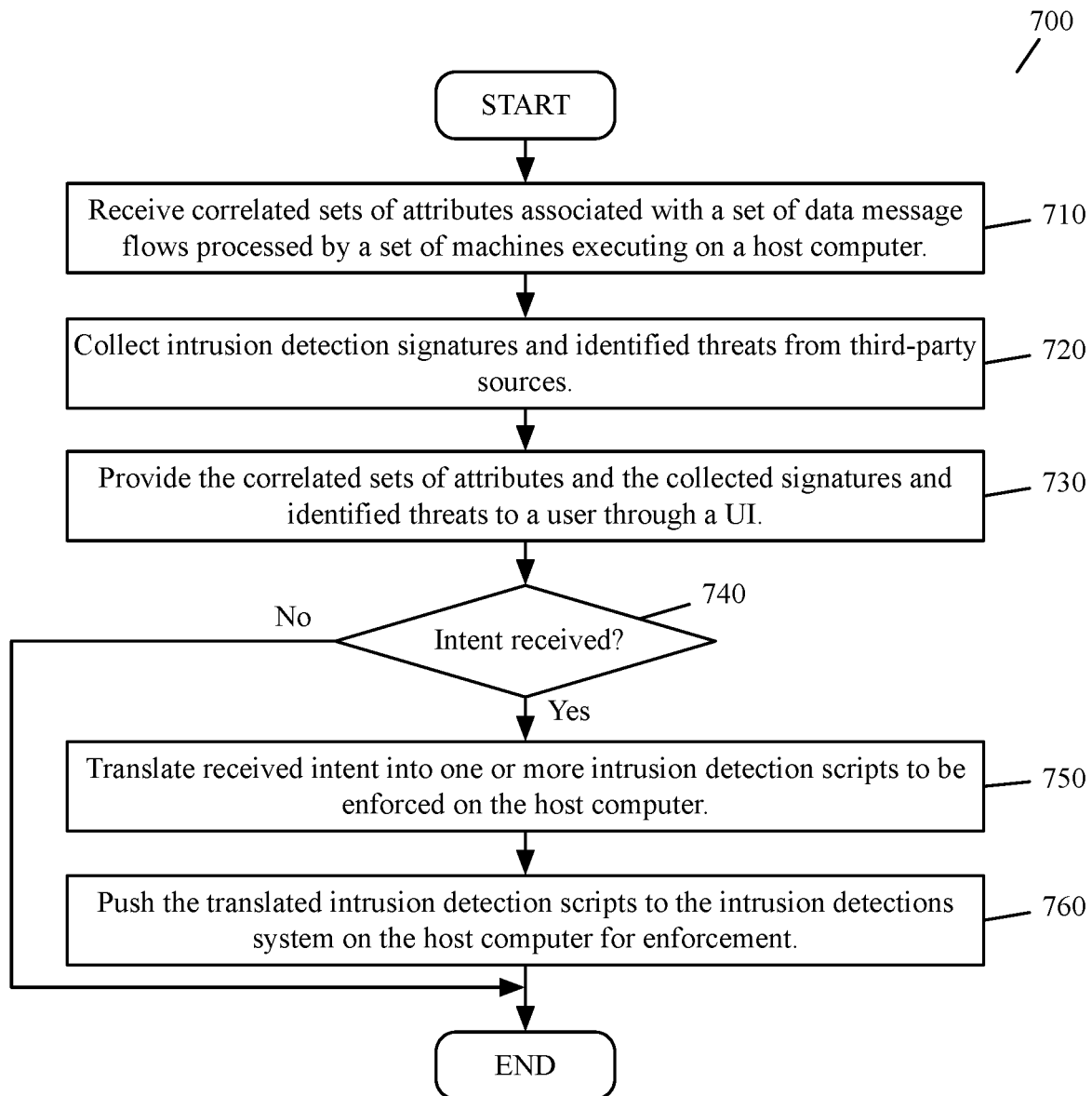
FIG. 7 conceptually illustrates a process for identifying intrusion detection signatures to provide to host computers based on workloads performed in VMs (or other machines) that execute on the host computers, in some embodiments.

FIG. 7 conceptually illustrates a process 700 for identifying intrusion detection signatures to provide to host computers based on workloads performed in VMs (or other machines) that execute on the host computers. The process 700 is performed by the management plane IDS framework 200, in some embodiments. The process 700 starts by receiving (at 710) correlated sets of attributes associated with a set of data message flows processed by a set of machines executing on a host computer. As described above with reference to the process 500, the correlated sets of attributes include contextual attributes and flow attributes (e.g., AppIDs) that have been correlated by a data plane correlation engine that is part of an intrusion detection system on the host computer.

Next, the process collects (at 720) rules and identified threats (e.g., event information) from third-party sources. The third-party sources include sources other than those executing on the host computer from which the correlated attributes were received, in some embodiments. For example, the third-party sources in some embodiments include servers, other host computers in the datacenter, and other network elements.

The process provides (at 730) the correlated sets of attributes and the collected rules and identified threats to a user through a UI. By providing the attributes, rules, and identified threats to the user, some embodiments enable the user to define intent for one or more intrusion detection signatures in the form of an intent-based API command. As described above, for instance, intrusion detection signatures can be defined based on a variety of contextual attributes, and can be used to detect anomalous user behavior and/or anomalous data message traffic behavior, according to some embodiments. Examples of user-defined intent, in some embodiments, can include "alert if user X AND has Y number of failed logins", "deny if user X AND tries to start process Y OR process Z", "alert if user X AND tries to do a network login", etc. In some embodiments, the process also provides a set of templates for generating intent-based API commands defining intent.

The process determines (at 740) whether any intent definitions (i.e., intent-based API commands) have been received from the user through the UI. While the process 700, in some embodiments, always provides the correlated sets of attributes and collected rules and identified threats to the user for viewing, it is up to the user to determine whether or not to provide any intent definitions based on the provided information.

In some embodiments, in addition to the hierarchal API commands, the process receives a selection of a set of intrusion detection signatures to be applied to a specific set of workloads. In some such embodiments, for example, both the script IDS engine 220 of the first portion of the management plane IDS framework 200 and the signature filtering engine 420 of the second portion of the management plane IDS framework 400 would receive different requests specified in an intent-based command (i.e., the script IDS engine 220 would receive intent definitions, while the signature filtering engine 420 would receive signature sets specified for different workloads).

When the process determines (at 740) that no intent definitions have been received, the process 700 ends. Alternatively, when the process determines (at 740) that at least one intent definition (i.e., intent-based API command) has been received from the user, the process transitions to translate (at 750) the received intent into one or more intrusion detection rules (i.e., scripts) to be enforced on the host computer. The script 300 illustrated by FIG. 3, for example, is a script translated by a network manager based on an intent-based API command that includes intent that specifies "deny if user ANY AND logs in via FTP AND denied 20 times". The script 300 would cause an alert to be sent out (e.g., to a network manager) that identifies the detected behavior.

The process then pushes (at 760) the translated intrusion detection rules to the intrusion detection system on the host computer for enforcement. For instance, in the management plane IDS framework 200 described above, the script IDS engine 220 pushes the translated scripts to the IDS scripts storage 225 from which they can be distributed by the network controllers 280 to SDDC resources 285. Following 760, the process 700 ends.

Figure 8:
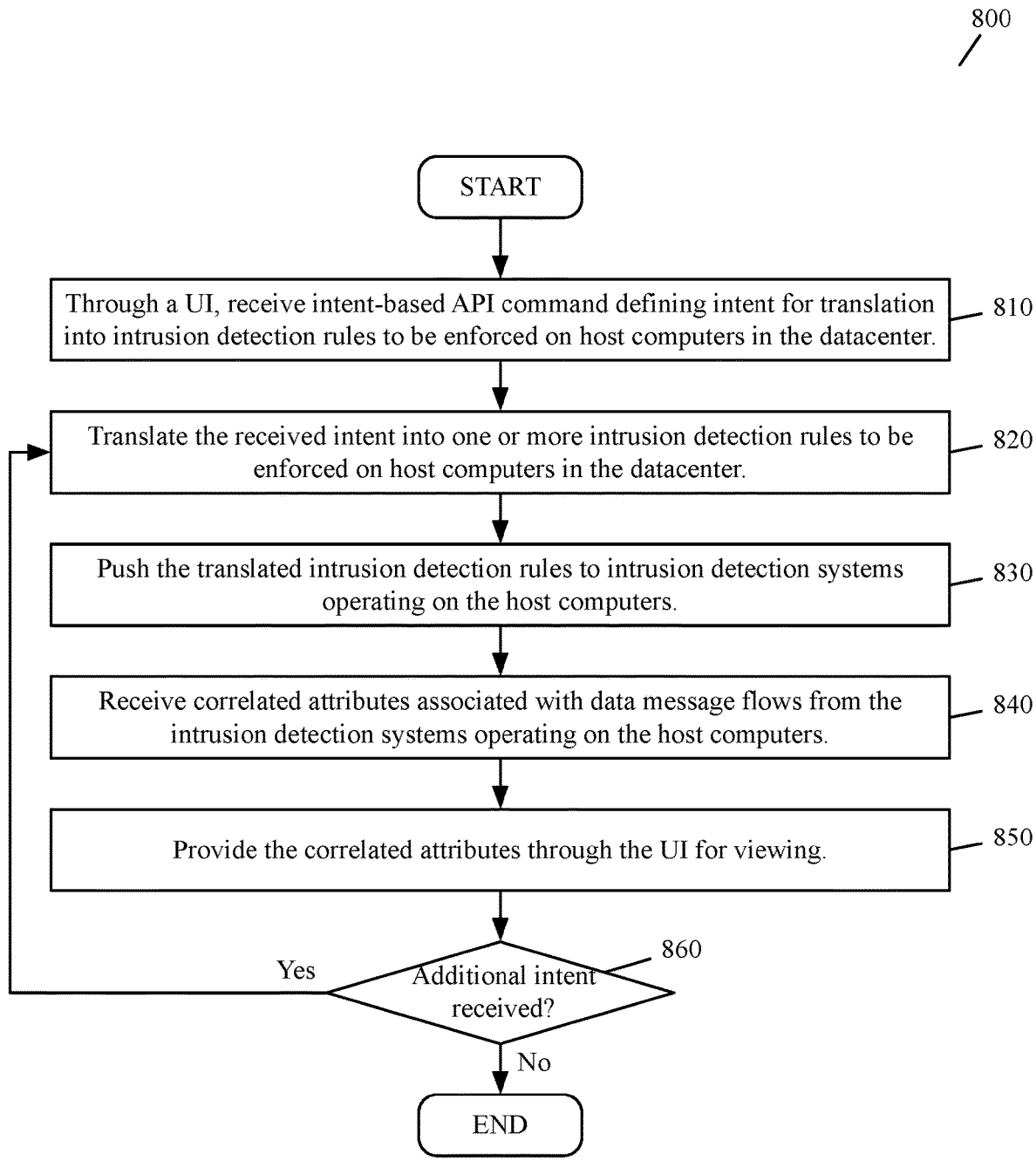
FIG. 8 conceptually illustrates another process that is performed by the management plane IDS framework, in some embodiments, to modify intrusion detection signatures enforced on host computers in a datacenter based on current data message flows processed by machines executing on the host computers.

FIG. 8 conceptually illustrates another process 800 that is performed by the management plane IDS framework, in some embodiments, to modify intrusion detection signatures enforced on host computers in a datacenter based on current data message flows processed by machines executing on the host computers. The process 800 starts, at 810, by receiving, through a UI, an intent-based API command defining intent for translation into one or more intrusion detection scripts. The intent, in some embodiments, can be defined for enforcement on any number of host computers in the datacenter.

At 820, the process translates the received intent into one or more intrusion detection scripts to be enforced on one or more host computers in the datacenter. In some embodiments, for example, the intent is defined by a user based on a variety of contextual attributes previously provided by the framework through the UI. The variety of contextual attributes, in some embodiments, can include attributes received from multiple host computers and be associated with multiple different data message flows and multiple different workloads performed by machines on the multiple host computers.

The process then pushes (at 830) the translated intrusion detection scripts to intrusion detection systems operating on the host computers. In some embodiments, as described for the framework 200, the script IDS engine 220 stores the translated intrusion detection scripts in the IDS scripts storage 225, and the set of network controllers 280 distribute the intrusion detection scripts to applicable SDDC resources 285 (e.g., intrusion detection systems). Alternatively, in some embodiments, the set of network controllers 280 provide the intrusion detection scripts to local controllers for distribution to the SDDC resources.

Next, the process receives (at 840) correlated attributes associated with data message flows from the intrusion detection systems operating on the host computers. As described in the embodiments above, the correlated attributes, in some embodiments, include contextual attributes and flow attributes collected by DPI engines and GI agents (i.e., via context engines) on the host computers that were correlated by DP correlation engines of the intrusion detection systems operating on the host computers.

Following 840, the process provides (at 850) the correlated attributes through the UI for viewing (e.g., by a network administrator). By providing the correlated attributes for viewing, the process 800 allows users to define intent, or modify intent, for intrusion detection scripts based on current conditions. In some embodiments, the attributes are provided as reports on a per-flow basis for viewing, while in other embodiments, the attributes are provided as reports for multiple different flows processed on the different host computers.

The process determines (at 860) whether additional intent (i.e., intent-based API commands defining intent) has been received through the UI based on the provided attributes. When the process determines, at 860, that additional intent has been received, the process returns to 820 to translate the received intent into intrusion detection scripts for enforcement on host computers in the datacenter. In some embodiments, users can modify intent for existing intrusion detection scripts and/or define intent to create new intrusion detection scripts based on the provided attributes. In addition to the contextual attributes, the process 800 also provides other information (e.g., event information from third-party sources) through the UI for the user to take into consideration. Otherwise, when the process determines at 860 that no additional intent has been received, the process 800 ends.

Figure 9:
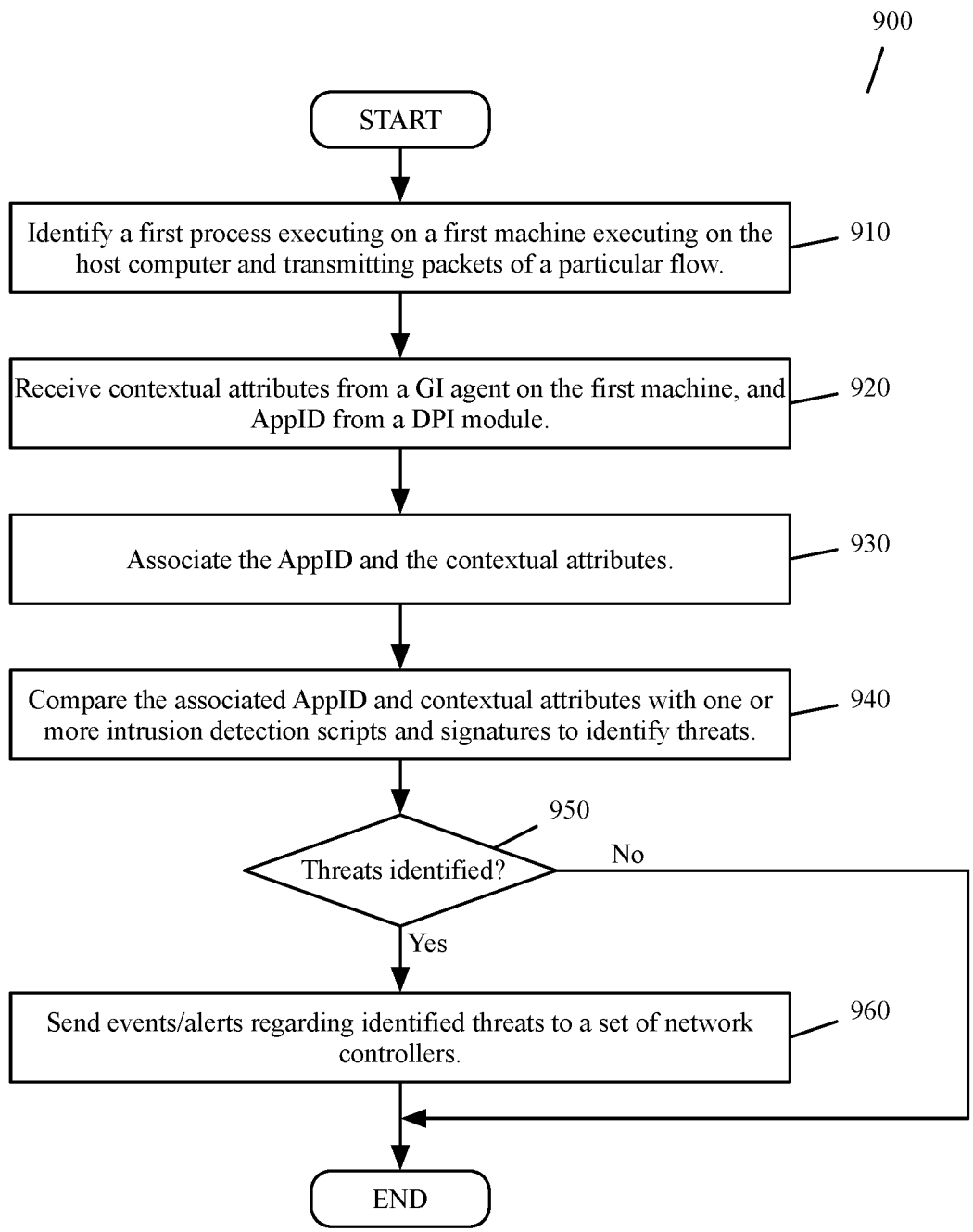
FIG. 9 conceptually illustrates a process performed in some embodiments by an intrusion detection system executing on a host computer to process a data message flow.
Figure 10:
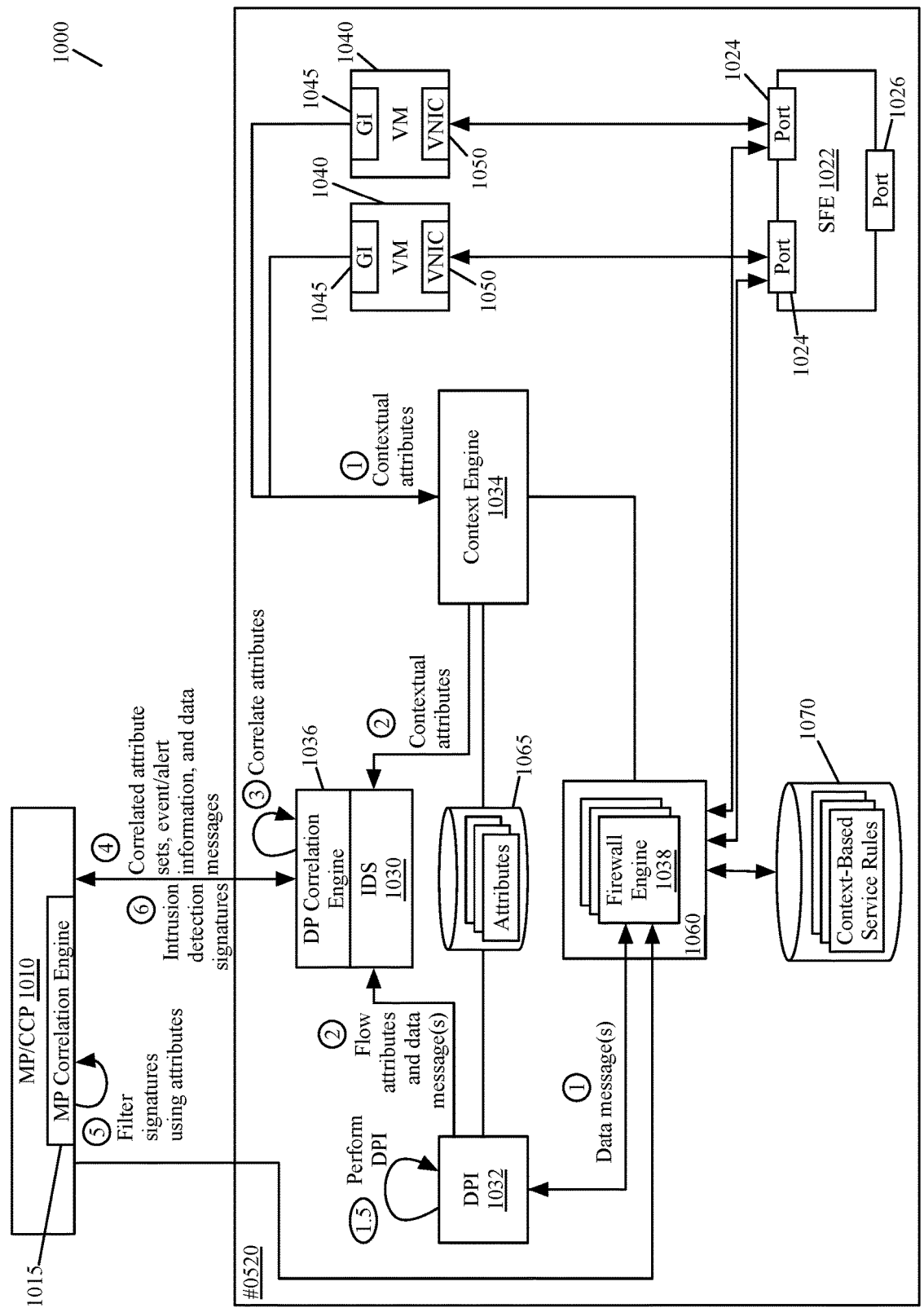
FIG. 10 illustrates a more detailed example of a datacenter in which the intrusion detection and prevention system of some embodiments is implemented.

FIG. 9 conceptually illustrates a process 900 performed in some embodiments by an intrusion detection system executing on a host computer to process a data message flow. The process 900 will be described with reference to FIG. 10, which illustrates a more detailed example of a datacenter 1000 in which the intrusion detection and prevention system of some embodiments is implemented.

The datacenter 1000 also includes a management plane/central control plane 1010 and a host computer 1020. The host computer 1020 includes VMs 1040, a software forwarding element (SFE) 1022, an IDS 1030, a context engine 1034, a DPI module 1032, service engines 1060, attribute storage 1065, and context-based rules storages 1070. Additionally, the VMs 1040 include GI agents 1045 and VNICs 1050, the service engines 1060 include at least firewall engine 1038, and the SFE 1022 includes ports 1024 and 1026.

Each VNIC 1050 of each VM 1040 is responsible, in some embodiments, for exchanging messages between its VM 1040 and the SFE 1022. Each VNIC 1050 connects to a particular port 1024 of the SFE 1022. The SFE 1022 also connects to a physical network interface card (PNIC) (not shown) of the host. In some embodiments, the VNICs 1050 are software abstractions created by the hypervisor of one or more PNICs of the host.

In some embodiments, the SFE 1022 maintains a single port 1024 for each VNIC 1050 of each VM 1040. The SFE 1022 connects to the host PNIC (through a NIC driver (not shown)) to send outgoing messages and to receive incoming messages. In some embodiments, the SFE 1022 is defined to include a port 1026 that connects to the PNIC's driver to send and receive messages to and from the PNIC. The SFE 1022 performs message-processing operations to forward messages that it receives on one of its ports to another one of its ports. For example, in some embodiments, the SFE 1022 tries to use data in the message (e.g., data in the message header) to match a message to flow-based rules, and upon finding a match, to perform the action specified by the matching rule (e.g., to hand the message to one of its ports 1024 or 1026, which directs the message to be supplied to a destination VM or to the PNIC).

In some embodiments, the SFE 1022 is a software switch, while in other embodiments it is a software router or a combined software switch/router. The SFE 1022 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software, and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), "VXLAN: A Framework for Overlaying Virtualized Layer 2 Networks over Layer 3 Networks", IETF.

The ports 1024 of the SFE 1022 in some embodiments include one or more function calls to one or more modules that implement special input/output (I/O) operations on incoming and outgoing messages that are received at the ports. Examples of I/O operations that are implemented by the ports 1024 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 1024 can implement a chain of I/O operations on incoming and/or outgoing messages in some embodiments. Also, in some embodiments, other modules in the data path (such as the VNICs 1050, port 1026, etc.) implement the I/O function call operations instead of, or in conjunction with, the ports 1024.

In some embodiments, one or more of function calls of the SFE ports 1024 can be to one or more service engines 1060 that process context-based service rules in the context-based service rule storages 1070. The context-based service rules storages 1070, in some embodiments, can also include intrusion detection scripts and signatures to be enforced by the firewall engine 1038, or another service engine 1060, in some embodiments. Also, while the DPI module 1032 is shown separately from the service engines 1060, other embodiments may include the DPI module 1032 as one of the service engines 1060. In some embodiments, each service engine 1060 has its own context-based service rule storage 1070. Also, in some embodiments, each VM 1050 has its own instance of each service engine 1060. In other embodiments, one service engine 1060 can service data message flows for multiple VMs on a host (e.g., VMs for the same logical network).

To perform its service operation for a data message flow, a service engine 1060 in some embodiments tries to match the flow identifier (e.g., the five-tuple identifier) and/or the flow's associated context attribute set to the rule identifiers of its service rules in its context-based service rule storage 1070. Specifically, for a service engine 1060 to perform its service check operation for a data message flow, the SFE port 1024 that calls the service engine 1060 supplies a set of attributes of a message that the port 1024 receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

In some embodiments, the context-based service rules storages 1070 are defined in a hierarchical manner to ensure that a message rule check will match a higher priority rule before matching a lower priority rule when the message's attribute subset matches multiple rules. Also, in some embodiments, the context-based service rules storages 1070 contain a default rule that specifies a default action for any message rule check that cannot identify any other service rules. This default rule will be a match for all possible attribute subsets, in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rules storages 1070 based on the message's identified context attribute set, the service engine 1060 of some embodiments stores the service rule (or a reference to the service rule) in a connection state cache storage (not shown), so that it can later use this service rule for subsequent data messages of the same flow.

In some embodiments, the DPI module 1032 performs deep packet inspection on a data message flow at the direction of the firewall engine 1038. Specifically, when the firewall engine 1038 receives a new data message that is part of a new data message flow, the firewall engine 1038 in some embodiments directs the DPI module 1032 to inspect that new data message and one or more of the next few data messages in the same flow. Based on this examination, the DPI module 1032 identifies the type of traffic (i.e., the application on the wire) that is being sent in this data message flow, generates an AppID for this traffic type, stores this AppID in the attribute storage 1065, and provides the AppID to the IDS 1030. In some embodiments, the context attribute sets are stored in the attribute storage 1065 based on flow identifiers and/or process identifiers. Accordingly, in some embodiments, the DPI module 1032 stores the AppID for a new data message flow in the attribute storage 1065 based on that flow's five-tuple identifier.

In some embodiments, the context engine 1034 pushes to the service engines 1060 the AppID for a new data message flow once the DPI module 1032 stores the AppID in the attribute storage 1065. In other embodiments, the context engine 1034 pulls the AppID from the attribute storage 1065 whenever it is queried for the contextual attributes for a data message flow by a service engine 1060. In some embodiments, the context engine 1034 uses the five-tuple identifier of the flow to identify the record in the attribute storage 1065 with the matching record identifier and the AppID.

Returning to FIG. 9, the process 900 starts at 910 by identifying a first process executing on a first machine that executes on the host computer and transmits data messages of a particular data message flow. For example, when a process starts on one of the VMs 1040, the GI agent 1045 of that VM 1040 provides a process event identifier to the context engine 1034 (e.g., via a MUX, not shown), which then provides the process event identifier to the IDS 1030.

Next, the process receives (at 920) contextual attributes from the GI agent on the first machine and receives an AppID associated with the particular data message flow from a DPI module. In the datacenter 1000, for example, the DPI module 1032 and the context engine 1034 are shown, respectively, providing the AppID and contextual attributes to the IDS 1030 after the DPI module 1032 is shown performing DPI to obtain the AppID and the context engine 1034 is shown receiving contextual attributes from the GI agents 1045. In some embodiments, operations 910 and 920 are performed simultaneously (i.e., the contextual attributes are received by the context engine along with the process event identifier). In some embodiments, the IDS automatically receives contextual attributes from the DPI module and context engine on a per-data message basis, or a per-flow basis, while in other embodiments, the IDS requests contextual attributes from the DPI module and context engine on a per-data message basis, or a per-flow basis.

The process then associates (at 930) the received AppID and contextual attributes, and compares (at 940) the associated AppID and contextual attributes with one or more intrusion detection signatures (e.g., the script 300) to identify any current threats (e.g., APTs). In some embodiments, for example, based on the associated contextual attributes, the process 900 identifies that a specific type of application (e.g., specific type of medical application or financial application) executes on a particular VM and is sending out a particular type of data at a particular rate and volume, each data being one or more bits in a bit pattern (i.e., a generated signature) that gets mapped to a stored signature.

At 950, the process determines whether any threats were identified. For instance, none of the signatures generated for the data messages matching any stored signatures would indicate that no threats have been detected. When the process determines (at 950) that no threats were identified, the process 900 ends. Otherwise, when the process determines (at 950) that one or more threats were identified, the process sends (at 960) event and alert information, along with correlated attribute sets and data messages (i.e., copies of data message) to the management plane/central control plane. For example, in the datacenter 1000, the IDS 1030 is shown providing (at the encircled 4) event and alert information along with correlated attribute sets and data messages to the management plane/central control plane 1010. As described above for the process 500, the management plane provides this information for viewing by network administrators through a UI, according to some embodiments. Following 960, the process 900 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
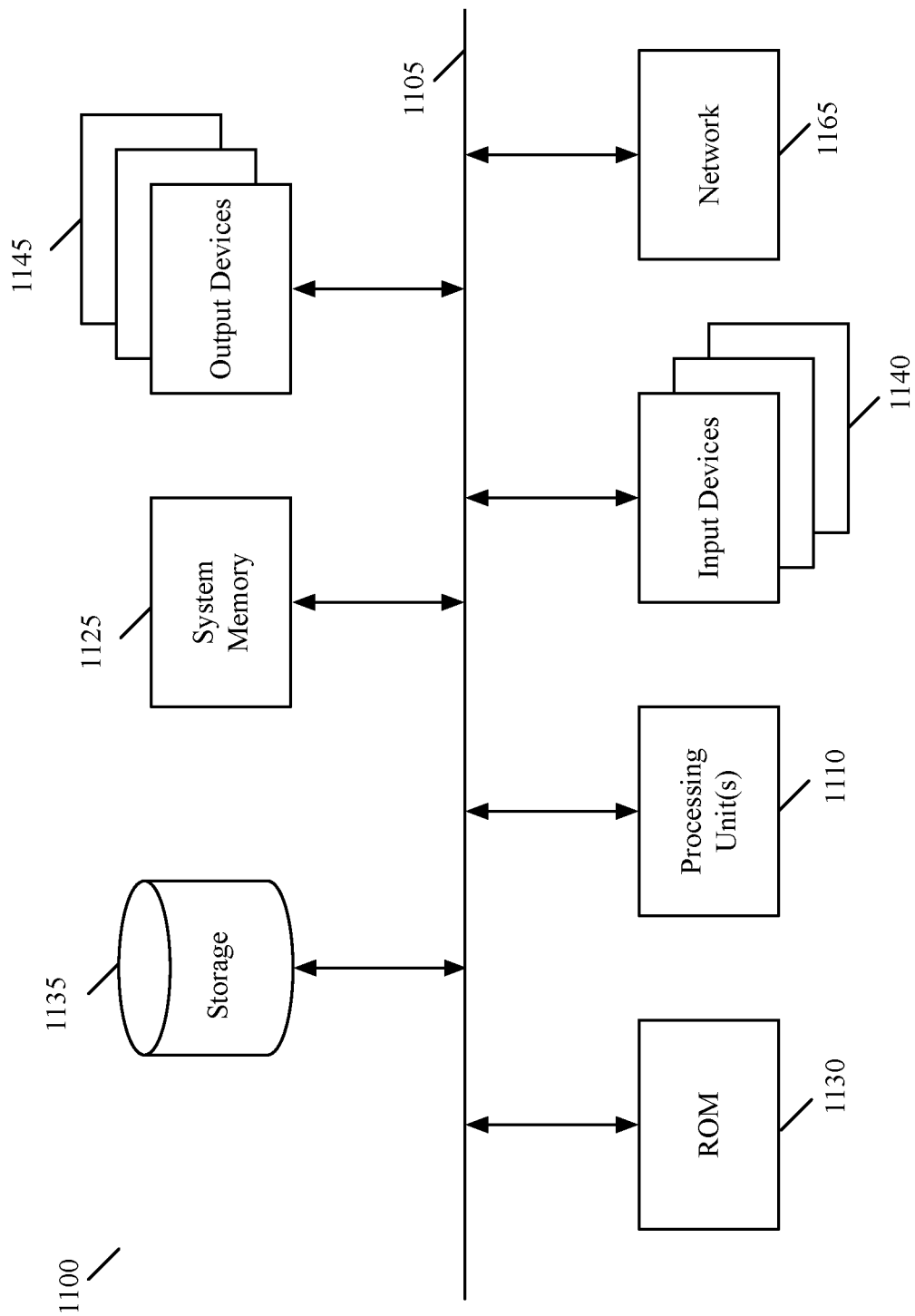
FIG. 11 conceptually illustrates a computer system with which some embodiments of the invention are implemented.

FIG. 11 conceptually illustrates a computer system 110800 with which some embodiments of the invention are implemented. The computer system 1100 can be used to implement any of the above-described hosts, controllers, gateway and edge forwarding elements. As such, it can be used to execute any of the above described processes. This computer system includes various types of non-transitory machine-readable media and interfaces for various other types of machine-readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system 1100. The permanent storage device 1135, on the other hand, is a read-and-write memory device. This device 1135 is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory 1125 is a volatile read-and-write memory, such as random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices 1140 enable the user to communicate information and select commands to the computer system 1100. The input devices 1140 include alphanumeric keyboards and pointing devices (also called "cursor control devices"). The output devices 1145 display images generated by the computer system 1100. The output devices 1145 include printers and display devices, such as cathode ray tubes (CRT) or liquid crystal displays (LCD). Some embodiments include devices such as touchscreens that function as both input and output devices 1140 and 1145.

Finally, as shown in FIG. 11, bus 1105 also couples computer system 1100 to a network 1165 through a network adapter (not shown). In this manner, the computer 1100 can be a part of a network of computers (such as a local area network ("LAN"), a wide area network ("WAN"), or an Intranet), or a network of networks (such as the Internet). Any or all components of computer system 1100 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims, because the claimed subject matters can be embodied in other specific forms without departing from the spirit of the subject matters.

The invention claimed is:

1. A method of implementing an intent-based intrusion detection and prevention system in a datacenter, the datacenter comprising at least one host computer executing a plurality of machines, the method comprising:
   receiving a filtered set of intrusion detection signatures to be enforced on the at least one host computer;
   using a set of contextual attributes associated with a particular data message to generate an intrusion detection signature for the particular data message, the generated intrusion detection signature comprising a bit pattern, each bit associated with a contextual attribute in the set; and
   comparing the generated intrusion detection signature with the received set of intrusion detection signatures to identify a matching intrusion detection signature in the received filtered set.

2. The method of claim 1, wherein the filtered set of intrusion detection signatures are received from a set of servers that perform a filtering operation to identify intrusion detection signatures applicable to workloads performed by machines executing on host computers in the datacenter, wherein identifying a matching intrusion detection signature causes an alert to be sent to the set of servers, the alert identifying a potential intrusion event based on the matching intrusion detection signature.

3. The method of claim 2, wherein the set of servers perform a particular action in response to the alert.

4. The method of claim 3, wherein the particular action comprises providing the alert in a report to a user.

5. The method of claim 2, wherein only a first subset of the received filtered set of intrusion detection signatures comprise intrusion detection signatures identified during the filtering operation performed by the set of servers, wherein a second subset of the received filtered set of intrusion detection signatures comprise intrusion detection signatures selected by a user and specified for workloads performed by the plurality of machines executing on the at least one host computer, wherein the workloads are identified based on a plurality of attributes associated with a set of data messages processed by the plurality of machines on the at least one host computer.

6. The method of claim 1, wherein comparing the generated intrusion detection signature with the received set of intrusion detection signatures comprises mapping bits in the bit pattern of the generated intrusion detection signature to one or more bits in a bit pattern of each intrusion detection signature in the filtered set of intrusion detection signatures.

7. The method of claim 6, wherein each workload that processed the particular data message is a bit or a plurality of bits in the generated intrusion detection signature's bit pattern.

8. The method of claim 6, wherein an active directory group of a source machine associated with the particular data message is a bit or a plurality of bits in the generated intrusion detection signature's bit pattern.

9. The method of claim 1, wherein the identified set of intrusion detection signatures comprise signatures for detecting (i) anomalous user behavior and (ii) anomalous data message traffic behavior.

10. The method of claim 1, wherein the method is performed by an intrusion detection system that operates on the at least one host computer and that is configured to use the filtered set of intrusion detection signatures to detect potential intrusion events on the at least one host computer.

* * * * *